(12) United States Patent
Barta

(10) Patent No.: US 12,210,518 B2
(45) Date of Patent: Jan. 28, 2025

(54) PERSONALIZED SPELLING CORRECTION

(71) Applicant: Dropbox, Inc., San Francisco, CA (US)

(72) Inventor: Matt Barta, Seattle, WA (US)

(73) Assignee: Dropbox, Inc.

( * ) Notice: Subject to any disclaimer, the term of this patent is extended or adjusted under 35 U.S.C. 154(b) by 115 days.

(21) Appl. No.: 16/871,398

(22) Filed: May 11, 2020

(65) Prior Publication Data

US 2021/0349888 A1   Nov. 11, 2021

(51) Int. Cl.
*G06F 16/242* (2019.01)
*G06F 16/2457* (2019.01)
*G06F 40/205* (2020.01)
*G06F 40/232* (2020.01)
*G06F 40/237* (2020.01)
*G06F 40/289* (2020.01)

(52) U.S. Cl.
CPC ...... *G06F 16/243* (2019.01); *G06F 16/24578* (2019.01); *G06F 40/205* (2020.01); *G06F 40/232* (2020.01); *G06F 40/237* (2020.01); *G06F 40/289* (2020.01)

(58) Field of Classification Search
CPC ............. G06F 16/243; G06F 16/24578; G06F 40/237; G06F 40/232; G06F 40/205; G06F 40/289
USPC ........................................................ 707/734
See application file for complete search history.

(56) References Cited

U.S. PATENT DOCUMENTS 3,670,310 A * 6/1972 Bharwani ............. G06F 16/902
5,050,218 A * 9/1991 Ikeda ........................ G06K 9/00
382/101
5,604,897 A    2/1997 Travis
6,665,662 B1   12/2003 Kirkwood et al.
7,099,937 B1 * 8/2006 Ochiai ..................... H04L 41/12
709/224

(Continued)

FOREIGN PATENT DOCUMENTS

JP   H08221427 A   *   8/1996

OTHER PUBLICATIONS

Non Patent Literature "Personalized Online Spell Correction for Personal Search", published proceedings of 2019 World Wide Web Conference (Year: 2019).*

(Continued)

*Primary Examiner* — Amy Ng
*Assistant Examiner* — Abdullah A Daud
(74) *Attorney, Agent, or Firm* — Polsinelli PC

(57) ABSTRACT

A content management system generates a personalized vocabulary for a user by analyzing content items associated with a namespace of the user. The content management system receives a query. The content management system determines that the at least one search term does not occur at least a threshold number of times in the personalized vocabulary. The content management system identifies a prefix of the at least one search term. The content management system parses the personalized vocabulary based on the prefix to identify a set of search term options. The content management system generates a personalized ranking of the search term options based on (a) an edit distance; (b) a frequency of each search term option's occurrence in the personalized vocabulary; or (c) a combination of (a) and (b). The content management system presents at least a top ranked search term option to the user.

15 Claims, 13 Drawing Sheets

(56) References Cited

U.S. PATENT DOCUMENTS

| | | | |
|---|---|---|---|
| 8,386,728 B1* | 2/2013 | Ionescu | G06F 16/13 |
| | | | 711/158 |
| 8,554,873 B1* | 10/2013 | Ganesh | G06F 16/24578 |
| | | | 709/217 |
| 2002/0143828 A1 | 10/2002 | Montero et al. | |
| 2005/0165777 A1* | 7/2005 | Hurst-Hiller | G06F 16/2471 |
| 2005/0267871 A1* | 12/2005 | Marchisio | G06F 16/3338 |
| 2006/0031197 A1* | 2/2006 | Oral | G06F 16/338 |
| 2006/0241944 A1* | 10/2006 | Potter | G06F 40/247 |
| | | | 704/254 |
| 2009/0012956 A1* | 1/2009 | Wen | G06F 16/338 |
| | | | 707/999.005 |
| 2010/0082570 A1* | 4/2010 | Altaf | G06F 16/332 |
| | | | 707/706 |
| 2010/0205172 A1* | 8/2010 | Luk | G06F 16/334 |
| | | | 707/742 |
| 2011/0264461 A1* | 10/2011 | Benja-Athon | G16H 40/20 |
| | | | 705/2 |
| 2012/0030201 A1* | 2/2012 | Pickering | G06F 16/334 |
| | | | 707/728 |
| 2013/0024459 A1* | 1/2013 | Bodd | G06F 16/319 |
| | | | 707/741 |
| 2013/0066896 A1* | 3/2013 | Mehanna | G06F 16/243 |
| | | | 707/E17.062 |
| 2013/0124492 A1* | 5/2013 | Gao | G06F 40/232 |
| | | | 707/706 |
| 2013/0144592 A1* | 6/2013 | Och | G06F 40/40 |
| | | | 704/2 |
| 2013/0185277 A1* | 7/2013 | Hampole | G06F 16/958 |
| | | | 707/711 |
| 2013/0238629 A1* | 9/2013 | Kosuri | H04L 41/0859 |
| | | | 707/741 |
| 2018/0060180 A1* | 3/2018 | Tan | G06F 16/113 |
| 2018/0067957 A1* | 3/2018 | Paterson | G06F 40/114 |
| 2019/0005089 A1* | 1/2019 | Kempf | G06F 16/248 |
| 2019/0259387 A1 | 8/2019 | Mertens et al. | |
| 2019/0362003 A1 | 11/2019 | Zhang et al. | |
| 2019/0370393 A1* | 12/2019 | Finch | G06F 16/3338 |
| 2020/0265011 A1* | 8/2020 | Liu | G06F 16/185 |
| 2021/0036927 A1* | 2/2021 | Mantri | H04L 41/12 |

OTHER PUBLICATIONS

Non Patent Literature "Personalized Online Spell Correction for Personal Search"; published proceedings of 2019 World Wide Web. (Year: 2019).*

Learning Phrase-Based Spelling Error Models from Clickthrough Data (Year: 2010).*

"Personalized Online Spell Correction for Personal Search", published proceedings of 2019 World Wide Web Conference (Year: 2019).*

Gupta J., et al., "Personalized Online Spell Correction for Personal Search," retrieved from https://dl.acm.org/doi/fullHtml/10.1145/3308558.3313706, located via Google, May 2019, 16 pages.

* cited by examiner

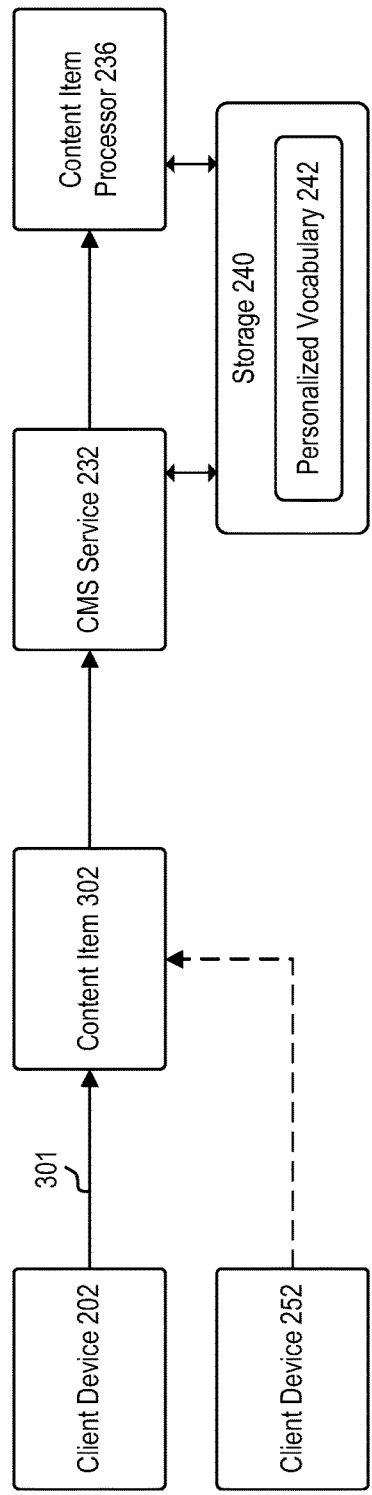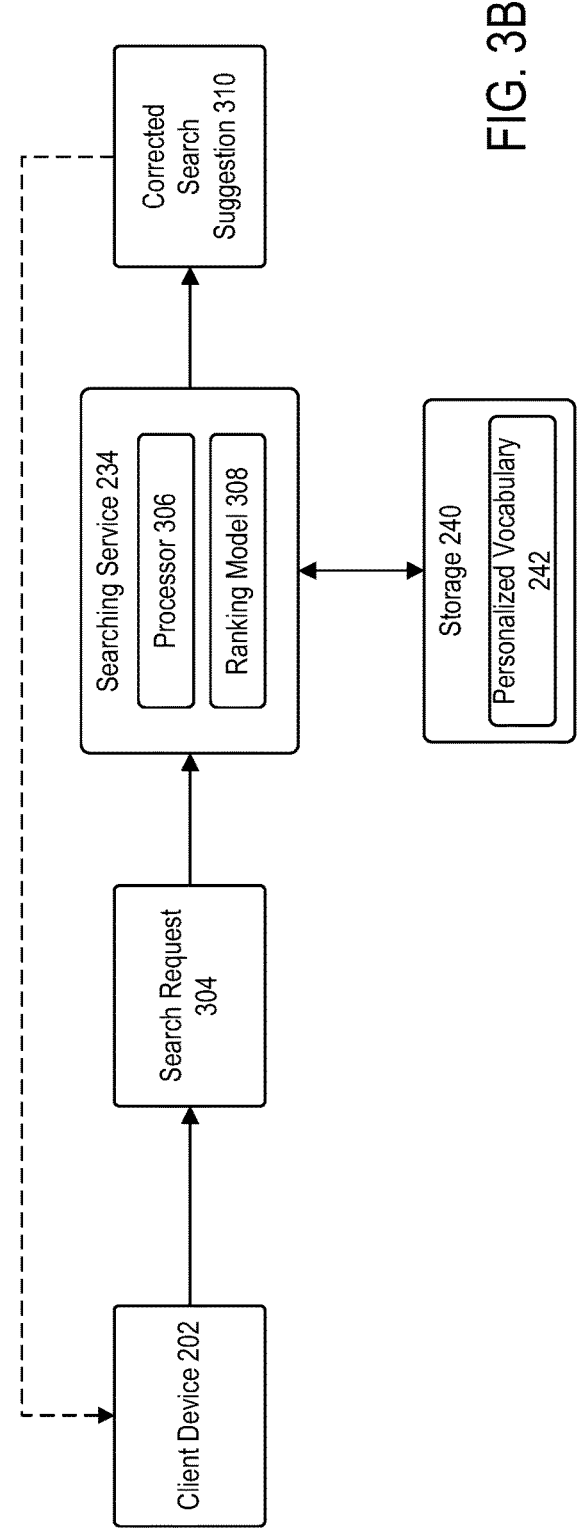

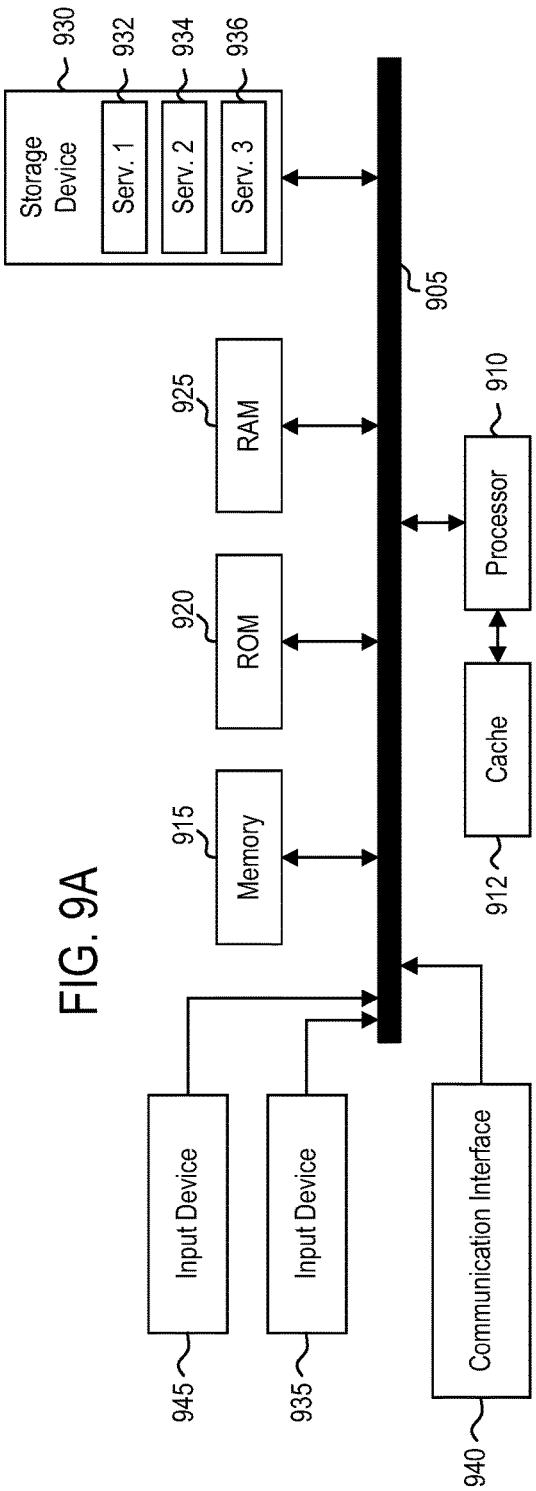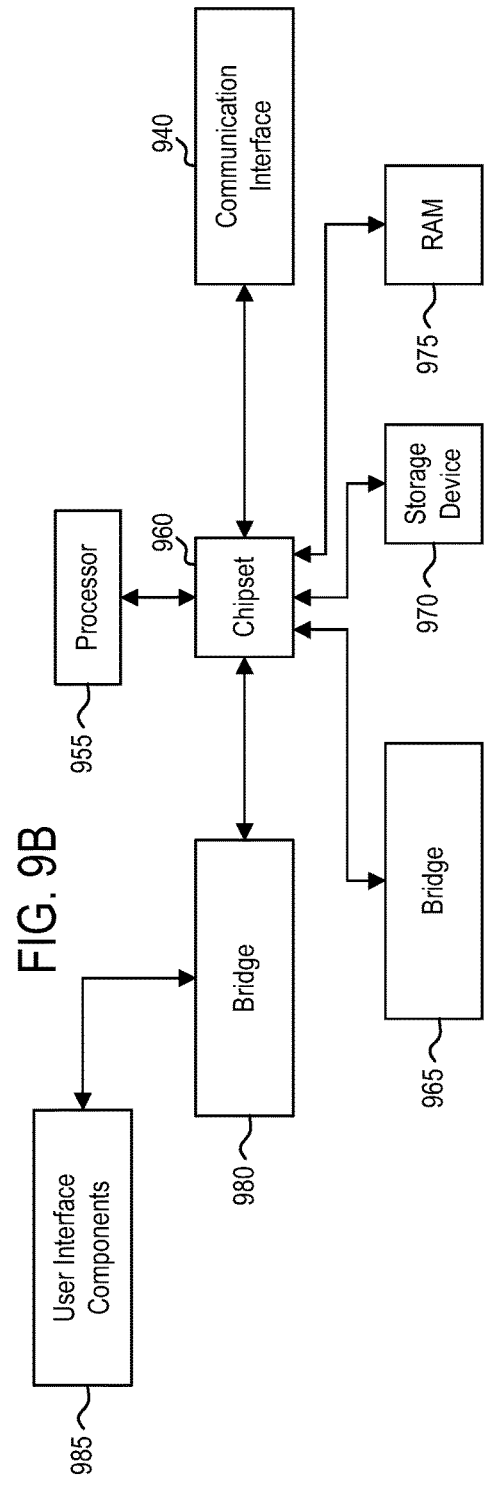

PERSONALIZED SPELLING CORRECTION

TECHNICAL FIELD

The present technology pertains to the processing of search requests, and more specifically pertains to generating corrected search suggestions based on personalized vocabularies of users.

BACKGROUND

User search queries often include typos or misspellings, which without correction can lead to poor search results. Spelling correction is a basic enhancement to search that allows users to find desired content faster by reducing the number of queries they have to submit. Unfortunately, generic spelling correction algorithms often lead to undesired corrections, even when augmented with a custom generic vocabulary.

SUMMARY

In some embodiments, a method is disclosed herein. A content management system generates a personalized vocabulary for a user by analyzing content items associated with a namespace of the user. The content management system receives a query. The query includes at least one search term. The content management system determines that the at least one search term does not occur at least a threshold number of times in the personalized vocabulary. The content management system identifies a prefix of the at least one search term. The content management system parses the personalized vocabulary based on the prefix to identify a set of search term options. The content management system generates a personalized ranking of the search term options. The personalized ranking is based on (a) an edit distance between each search term option and the at least one search term; (b) a frequency of each search term option's occurrence in the personalized vocabulary; or (c) a combination of (a) and (b). The content management system presents at least a top ranked search term option to the user.

In some embodiments, a non-transitory computer readable medium is disclosed herein. The non-transitory computer readable medium includes one or more sequences of instructions that, when executed by one or more processors, cause a processor in communication with one or more input devices to perform operations. The operations include receiving, by a content management system from a user, a query. The query includes at least one search term. The operations further include comparing, by the content management system, the at least one search term to a personalized vocabulary associated with the user. The personalized vocabulary includes an indexing of a plurality of terms contained in content items associated with the user. The operations further include determining, by the content management system, that the at least one search term includes a typographical error. The operations further include parsing, by the content management system, the personalized vocabulary based on the term that is misspelled. The operations further include generating, by the content management system, a set of search term options by comparing the at least one search term to the personalized vocabulary. The operations further include generating, by the content management system, a personalized ranking of the search term options. The personalized ranking is based on (a) an edit distance between each search term option and the at least one search term; (b) a frequency of each search term option's occurrence in the personalized vocabulary; or (c) a combination of (a) and (b). The operations further include presenting, by the content management system, at least a top ranked suggested correction to the user.

In some embodiments, a system is disclosed herein. The system includes one or more processors and a memory. The memory has programming instructions stored thereon, which, when executed by the one or more processors, performs one or more operations. The one or more operations include receiving, from a user, a query. The query includes at least a first search term and a second search term. The one or more operations further include comparing the first search term and the second search term to a personalized vocabulary associated with the user. The personalized vocabulary includes an indexing of a plurality of terms contained in content items associated with the user. The one or more operations further include determining that the first search term includes a typographical error. The one or more operations further include determining that the second search term does not include a typographical error. The one or more operations further include parsing the personalized vocabulary based on the first search term. The one or more operations further include generating a set of search term options by comparing the at least one search term to the personalized vocabulary. The one or more operations further include generating a set of phrases by combining each search term option with the second search term. The one or more operations further include comparing each phrase in the set of phrases to the personalized vocabulary. The one or more operations further include generating a personalized ranking of phrases. The personalized ranking is based on (a) an edit distance between each phrase and the first search term; (b) the second search term and a frequency of each phrase's occurrence in the personalized vocabulary; or (c) a combination of (a) and (b). The one or more operations further include presenting at least a top ranked suggested correction to the user.

BRIEF DESCRIPTION OF THE DRAWINGS

The above-recited and other advantages and features of the disclosure will become apparent by reference to specific embodiments thereof, which are illustrated in the appended drawings. Understanding that these drawings depict only example embodiments of the disclosure and are not, therefore, to be considered to be limiting of its scope, the principles herein are described and explained with additional specificity and detail through the use of the accompanying drawings.

FIG. 3A is a block diagram illustrating an exemplary process for maintaining a personalized vocabulary, according to example embodiments.

FIG. 3B is a block diagram illustrating an exemplary process for processing a search request, according to example embodiments.

FIG. 9A illustrates an example system configuration for implementing various embodiments of the present technology, according to example embodiments.

FIG. 9B illustrates an example system configuration for implementing various embodiments of the present technology, according to example embodiments.

DETAILED DESCRIPTION

Various examples of the present technology are discussed in detail below. While specific implementations are discussed, it should be understood that this is done for illustration purposes only. A person skilled in the relevant art will recognize that other components and configurations may be used without parting from the spirit and scope of the present technology.

The one or more techniques disclosed herein address the need in the art for providing users with one or more corrected search suggestions upon receiving a search request. For example, the one or more techniques described herein leverage a personalized vocabulary that is created for each user registered with a content management system. The personalized vocabulary may include an index of a plurality of terms and/or phrases contained in content items associated with the user. In some embodiments, the personalized vocabulary may be indexed by frequency of occurrence. In some embodiments, the personalized vocabulary may include more granular information, such as, but not limited to, a location of each occurrence of a term and/or phrase within the user's underlying folder structure, a type of device that provided each term and/or phrase, a date associated with each term and/or phrase, and the like.

In operation, content management system may leverage the personalized vocabulary to provide more accurate search term suggestions to a user. For example, upon receiving a query, content management system may determine that a term in the query fails to occur at least a threshold number of times in personalized vocabulary. In some embodiments, a threshold number of times may be at least one time. Accordingly, content management system may utilize personalized vocabulary to determine what the user may have meant to submit as a search request. By utilizing personalized vocabulary, content management system may provide a more accurate search term suggestion to the user.

Figure 1:
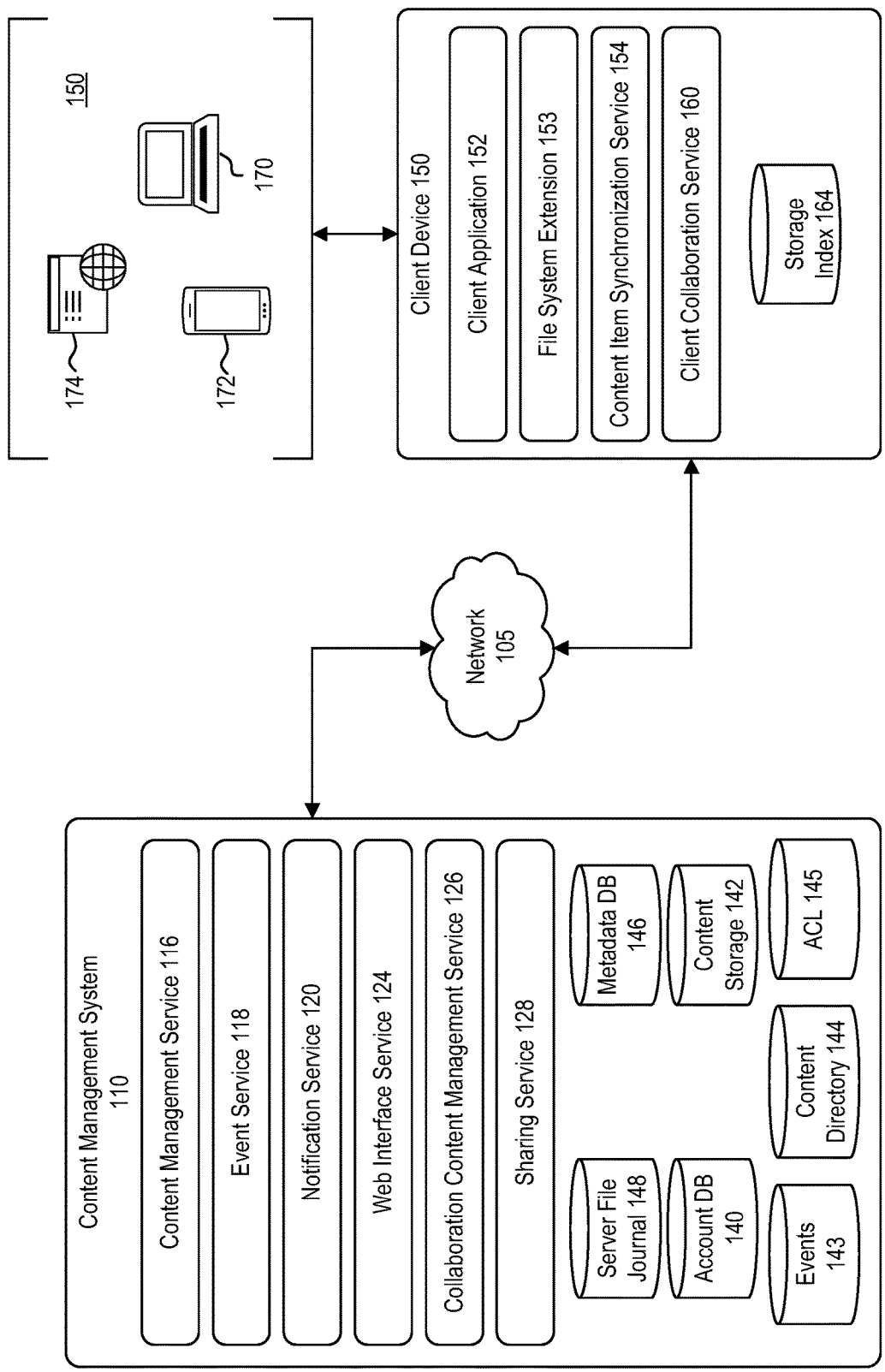
FIG. 1 illustrates an example system configuration of a content management system and client devices, according to example embodiments.

FIG. 1 is a block diagram illustrating a system configuration 100, according to example embodiments. System configuration 100 may include a content management system 110 interacting with a client device 150.

Content management system 110 may include one or more components. For example, as illustrated, content management system 110 may include content management service 116, event service 118, notification service 120, web interface service 124, collaboration content management service 126, and sharing service 128. In some embodiments, content management system 110 may further include one or more storage items. Such storage items may include, but are not limited to, server file journal 148, account database 140, events 143, content directory 144, access control list (ACL) 145, content storage 142, and metadata database 146.

Content management system 110 may communicate with client device 150 via network 105. Network 105 may be of any suitable type, including individual connections via the Internet, such as cellular or Wi-Fi networks. In some embodiments, network 105 may connect terminals, services, and mobile devices using direct connections, such as radio frequency identification (RFID), near-field communication (NFC), Bluetooth™, low-energy Bluetooth™ (BLE), Wi-Fi™ ZigBee™, ambient backscatter communication (ABC) protocols, USB, WAN, or LAN. Because the information transmitted may be personal or confidential, security concerns may dictate one or more of these types of connection be encrypted or otherwise secured. In some embodiments, however, the information being transmitted may be less personal, and therefore, the network connections may be selected for convenience over security.

Network 105 may include any type of computer networking arrangement used to exchange data. For example, network 105 may include any type of computer networking arrangement used to exchange information. For example, network 105 may be the Internet, a private data network, virtual private network using a public network and/or other suitable connection(s) that enables components in system configuration 100 to send and receiving information between the components of system configuration 100.

Client device 150 may include one or more components. For example, as illustrated, client device 150 may include client application 152, content item synchronization service 154, file system extension 153, and client collaboration service 160. In some embodiments, client device 150 may further include one or more storage components. As illustrated, client device 150 may include storage index 164.

Accounts

Content management system 110 can store content items in association with accounts, as well as perform a variety of content item management tasks, such as retrieve, modify, browse, and/or share the content item(s) (e.g., collaboration documents). Furthermore, content management system 110 can enable an account to access collaboration document(s) from multiple client devices.

Content management system 110 supports a plurality of accounts. An entity (user, group of users, company, etc.) can create an account with content management system, and account details can be stored in account database 140. Account database 140 can store profile information for registered entities. In some cases, profile information for registered entities includes a username and/or email address. Account database 140 can include account management information, such as account type (e.g. various tiers of free or paid accounts), storage space allocated, storage space used, client devices 150 having a registered content management client application 152 resident thereon, security settings, personal configuration settings, etc.

Account database 140 can store groups of accounts associated with an entity. Groups can have permissions based on group policies and/or access control lists, and members of the groups can inherit the permissions. For example, a marketing group can have access to one set of collaboration documents while an engineering group can have access to another set of collaboration documents. An administrator group can modify groups, modify user accounts, etc.

Content Item Storage

A feature of content management system 110 is the storage of content items, which can be stored in content storage 142. As used herein, content items can be any digital data such as documents, collaborative content items, text files, audio files, image files, video files, webpages, executable files, binary files, messages, etc. A content item can also include collections or other mechanisms for grouping content items together with different behaviors, such as folders, zip files, playlists, albums, etc. A collection can refer to a folder, or a plurality of content items that are related or grouped by a common attribute. Content items can also include hyperlinks, shortcuts or placeholder files storing metadata identifying other content items, such as other content items stored on content management system 110 or on a third-party content management system. In some embodiments, content storage 142 is combined with other types of storage or databases to handle specific functions. Content storage 142 can store content items, while metadata regarding the content items can be stored in metadata database 146. Likewise, data regarding where a content item is stored in content storage 142 can be stored in content directory 144. Additionally, data regarding changes, access, etc. can be stored in server file journal 148. Each of the various storages/databases such as content storage 142, content directory 144, server file journal 148, and metadata database 146 can be comprised of more than one such storage or database and can be distributed over many devices and locations. Other configurations are also possible. For example, data from content storage 142, content directory 144, server file journal 148, and/or metadata database 146 may be combined into one or more content storages or databases or further segmented into additional content storages or databases. Thus, content management system 110 may include more or less storages and/or databases than shown in FIG. 1.

In some embodiments, content storage 142 is associated with at least one content management service 116, which includes software or other processor executable instructions for managing the storage of content items including, but not limited to, receiving content items for storage, preparing content items for storage, selecting a storage location for the content item, retrieving content items from storage, etc. In some embodiments, content management service 116 can divide a content item into smaller chunks for storage at content storage 142. The location of each chunk making up a content item can be recorded in content directory 144. Content directory 144 can include a content entry for each content item stored in content storage 142. The content entry can be associated with a unique ID, which identifies a content item.

In some embodiments, the unique ID, which identifies a content item in content directory 144, can be derived from a deterministic hash function. This method of deriving a unique ID for a content item can ensure that content item duplicates are recognized as such since the deterministic hash function will output the same identifier for every copy of the same content item, but will output a different identifier for a different content item. Using this methodology, content management service 116 can output a unique ID for each content item.

Content management service 116 can also designate or record a content path for a content item. The content path can include the name of the content item and/or folder hierarchy associated with the content item. For example, the content path can include a folder or path of folders in which the content item is stored in a local file system on a client device. Content management service 116 can use the content path to present the content items in the appropriate folder hierarchy, such as a tree-like directory structure. While content items are stored in content storage 142 in blocks and may not be stored under a tree like directory structure, such directory structure is a comfortable navigation structure for users. Content management service 116 can define or record a content path for a content item wherein the "root" node of a directory structure can be a namespace for each account. Within the namespace can be a directory structure defined by a user of an account and/or content management service 116. Content directory 144 can store the content path for each content item as part of a content entry.

In some embodiments the namespace can include additional namespaces that appear in the directory structure as if they are stored within the root node. This can occur when an account has access to a shared collection. Shared collections can be assigned their own namespace within content management system 110. While shared collections are actually a root node for the shared collection, they are located subordinate to the user account namespace in the directory structure, and can appear as a folder within a folder for the user account. As addressed above, the directory structure is merely a comfortable navigation structure for users, but does not correlate to storage locations of content items in content storage 142.

While the directory structure in which an account views content items does not correlate to storage locations at content management system 110, the directory structure can correlate to storage locations on client device 150 depending on the file system used by client device 150. As addressed above, a content entry in content directory 144 can also include the location of each chunk making up a content item. More specifically, the content entry can include content pointers that identify the location in content storage 142 of the chunks that make up the content item.

In addition to a content path and content pointer, a content entry in content directory 144 can also include a user account identifier that identifies the user account that has access to the content item and/or a group identifier that identifies a group with access to the content item. In some embodiments, multiple user account identifiers can be associated with a single content entry indicating that the content item has shared access by the multiple user accounts. In some embodiments, user account identifiers associated with a single content entry can specify different permissions for the associated content item. In some embodiments, content directory 144 can describe a hierarchical structure of content items associated with a user account, the hierarchical structure being specific to the user account.

Content management service 116 can decrease the amount of storage space required by identifying duplicate content items or duplicate blocks that make up a content item or versions of a content item. Instead of storing multiple copies, content storage 142 can store a single copy of the content item or block of the content item and content directory 144 can include a pointer or other mechanism to link the duplicates to the single copy.

Content management service 116 can also store metadata describing content items, content item types, folders, file path, and/or the relationship of content items to various accounts, collections, or groups in metadata database 146, in association with the unique ID of the content item.

Content management service 116 can also store a log of data regarding changes, access, etc. in server file journal 148. Server file journal 148 can include the unique ID of the content item and a description of the change or access action along with a time stamp or version number and any other relevant data. Server file journal 148 can also include pointers to blocks affected by the change or content item access. Content management service can provide the ability to undo operations, by using a content item version control that tracks changes to content items, different versions of content items (including diverging version trees), and a change history that can be acquired from the server file journal 148. The change history can include a set of changes that, when applied to the original content item version, produce the changed content item version.

Content Item Synchronization

Another feature of content management system 110 is synchronization of content items with at least one client device 150. Client device(s) can take different forms and have different capabilities. For example, client device 170 can be a computing device having a local file system accessible by multiple applications resident thereon. Client device 172 can be a computing device wherein content items are only accessible to a specific application or by permission given by the specific application, and the content items are stored either in an application specific space or in the cloud. Client device 174 can be any client device accessing content management system 110 via a web browser and accessing content items via a web interface. While example client devices 170, 172, and 174 are depicted in form fusers such as a laptop, mobile device, or web browser, it should be understood that the descriptions thereof are not limited to devices of these example form fusers. For example, a mobile device such as client 172 might have a local file system accessible by multiple applications resident thereon, or client 172 might access content management system 110 via a web browser. As such, the form fuser should not be considered limiting when considering client 150's capabilities. One or more functions described herein with respect to client device 150 may or may not be available on every client device depending on the specific capabilities of the device—the file access model being one such capability.

In many embodiments, client devices are associated with an account of content management system 110, but in some embodiments client devices can access content using shared links and do not require an account.

As noted above, some client devices can access content management system 110 using a web browser. However, client devices can also access content management system 110 using client application 152 stored and running on client device 150. Client application 152 can include a content item synchronization service 154.

Content item synchronization service 154 can be in communication with content management service 116 to synchronize changes to content items between client device 150 and content management system 110.

Client device 150 can synchronize content with content management system 110 via content synchronization service 154. The synchronization can be platform agnostic. That is, content can be synchronized across multiple client devices of varying type, capabilities, operating systems, etc. Content synchronization service 154 can synchronize any changes (new, deleted, modified, copied, or moved content items) to content items in a designated location of a file system of client device 150.

Content items can be synchronized from client device 150 to content management system 110, and vice versa. In embodiments wherein synchronization is from client device 150 to content management system 110, a user can manipulate content items directly from the file system of client device 150, while file system extension 154 (which can be integrated with the local file system, or even the operating system kernel) can intercept read, write, copy, move, delete, add, modify, etc. commands relative to content items in the designated location of the file system of client device 150.

When file system extension 153 notices a write, move, copy, or delete command, it can notify content item synchronization service 154, which can synchronize the changes to content management system service 116. In some embodiments, content item synchronization service 154 can perform some functions of content management system service 116 including functions addressed above such as dividing the content item into blocks, hashing the content item to generate a unique identifier, etc. Content synchronization service 154 can index content within client storage index 164 and save the result in storage index 164. Indexing can include creating a unique identifier for each content item. In some embodiments, content synchronization service 154 creates this unique identifier by putting the data of the content item (e.g., excluding the filename and/or other metadata) through a hash function; as addressed above, content management system can use a similar process to provide identifiers to content on content management system 110.

Content synchronization service 154 can use storage index 164 to facilitate the synchronization of at least a portion of the content within client storage with content associated with a user account on content management system 110. For example, content synchronization service 154 can compare storage index 164 with content management system 110 and detect differences between content on client storage and content associated with a user account on content management system 110. Content synchronization service 154 can then attempt to reconcile differences by uploading, downloading, modifying, and deleting content on client storage as appropriate. Content management service 116 can store the changed or new block for the content item and update server file journal 148, metadata database 146, content directory 144, content storage 142, account database 140, etc. as appropriate.

When synchronizing from content management system 110 to client device 150, a modification, addition, deletion, move of a content item recorded in server file journal 148 can trigger a notification to be sent to client device 150 using notification service 117. When client device 150 is informed of the change to server file journal 148, client device can check storage index 164 to determine if the time stamp of the change occurred since the last synchronization, or determine if the specific change has been synchronized. When client device 150 determines that it is out of synchronization with content management system 110, content item synchronization service 154 requests content item blocks including the changes, and updates its local copy of the changed content items. In some embodiments, notification service can query other services or databases of content management system 110 such as server file journal 148 to gain more context for the notification, to determine if a notification can be batched with another notification or to supplement a notification.

Sometimes client device 150 might not have a network connection available. In this scenario, content item synchronization service 154 can monitor the linked collection for content item changes and queue those changes for later synchronization to content management system 110 when a network connection is available. Similarly, a user can manually start, stop, pause, or resume synchronization with content management system 110.

Content item synchronization service 154 can synchronize content associated with a particular user account on content management system 110. Alternatively, content item synchronization service 154 can selectively synchronize a portion of the content of the total content associated with the particular user account on content management system 110. Selectively synchronizing only a portion of the content can preserve space on client device 150 and save bandwidth.

In some embodiments, content item synchronization service 154 selectively stores a portion of the content associated with the particular user account and stores placeholder content items in client storage for the remainder portion of the content. For example, content item synchronization service 154 can store a placeholder content item that has the same filename, path, extension, metadata, of its respective complete content item on content management system 110, but lacking the data of the complete content item. The placeholder content item can be a few kilobytes or less in size while the respective complete content item might be significantly larger. After client device 150 attempts to access the content item, content item synchronization service 154 can retrieve the data of the content item from content management system 110 and provide the complete content item to accessing client device 150. This approach can provide significant space and bandwidth savings while still providing full access to a user's content on content management system 110.

Collaboration Features

Another feature of content management system 110 is to facilitate collaboration between users. Collaboration features include content item sharing, commenting on content items, co-working on content items, instant messaging, providing presence and seen state information regarding content items, etc.

Sharing

Content management system 110 can manage sharing content via sharing service 128. Sharing content by providing a link to the content can include making the content item accessible from any computing device in network communication with content management system 110. However, in some embodiments a link can be associated with access restrictions enforced by content management system 110. Sharing content can also include linking content using sharing service 128 to share content within content management system 110 with at least one additional user account (in addition to the original user account associated with the content item) so that each user account has access to the content item. The additional user account can gain access to the content by accepting the content, which will then be accessible through either web interface service 124 or directly from within the directory structure associated with their account on client device 150. The sharing can be performed in a platform agnostic manner. That is, the content can be shared across multiple client devices 150 of varying type, capabilities, operating systems, etc. The content can also be shared across varying types of user accounts.

To share a content item within content management system 110 sharing service 128 can add a user account identifier to a content entry in access control list database 145 associated with the content item, thus granting the added user account access to the content item. Sharing service 128 can also remove user account identifiers from a content entry to restrict a user account's access to the content item. Sharing service 128 can record content item identifiers, user account identifiers given access to a content item, and access levels in access control list database 145.

To share content items outside of content management system 110, sharing service 128 can generate a custom network address, such as a uniform resource locator (URL), which allows any web browser to access the content item or collection in content management system 110 without any authentication. To accomplish this, sharing service 128 can include content identification data in the generated URL, which can later be used to properly identify and return the requested content item. For example, sharing service 128 can include the account identifier and the content path or a content item identifying code in the generated URL. Upon selection of the URL, the content identification data included in the URL can be transmitted to content management system 110, which can use the received content identification data to identify the appropriate content item and return the content item.

In addition to generating the URL, sharing service 128 can also be configured to record in access control list database 145 that a URL to the content item has been created. In some embodiments, the content entry associated with a content item can include a URL flag indicating whether a URL to the content item has been created. For example, the URL flag can be a Boolean value initially set to 0 or false to indicate that a URL to the content item has not been created. Sharing service 128 can change the value of the flag to 1 or true after generating a URL to the content item.

In some embodiments, sharing service 128 can associate a set of permissions to a URL for a content item. For example, if a user attempts to access the content item via the URL, sharing service 128 can provide a limited set of permissions for the content item. Examples of limited permissions include restrictions that the user cannot download the content item, save the content item, copy the content item, modify the content item, etc. In some embodiments, limited permissions include restrictions that only permit a content item to be accessed from a specified domain, i.e., from within a corporate network domain.

In some embodiments, sharing service 128 can also be configured to deactivate a generated URL. For example, each content entry can also include a URL active flag indicating whether the content should be returned in response to a request from the generated URL. For example, sharing service 128 can only return a content item requested by a generated link if the URL active flag is set to 1 or true. Thus, access to a content item for which a URL has been generated can be easily restricted by changing the value of the URL active flag. This allows a user to restrict access to the shared content item without having to move the content item or delete the generated URL. Likewise, sharing service 128 can reactivate the URL by again changing the value of the URL active flag to 1 or true. A user can thus easily restore access to the content item without the need to generate a new URL.

In some embodiments, content management system 110 can designate a URL for uploading a content item. For example, a first user with a user account can request such a URL, provide the URL to a contributing user and the contributing user can upload a content item to the first user's user account using the URL.

Events

Content management system 110 can track, create, and store events involving content items and/or user activity. For example, when a user interacts with a content item (e.g., add, edit, post, share, delete, comment, move, rename, etc.) and/or interacts with another user (e.g., message, comment, collaborate, etc.), event service 118 can generate an event for such interaction. When event service 118 detects a user interaction with a content item and/or another user, event service 118 can create an event identifier (e.g., unique event identifier) and event type, and associate the event identifier and event type with the user (e.g., user identifier and namespace identifier) to create an event or event record for the interaction. After the event is created, event service 118 can send the event identifier and any information associated with the event to events 143 for storage.

Events 143 can include one or more storage systems, such as one or more databases, for storing events and associated information. In some examples, events 143 can include a distributed database or distributed storage system. Events 143 can receive and store the event data for access by content management system 110.

Presence and Seen State

Content management system 110 can provide information about how users are interacting or have interacted with a content item, such as a shared content item. Content management system 110 can report that a user with whom a content item is shared is currently viewing the content item. For example, client collaboration service 160 can notify notifications service 120 when client device 150 is accessing the content item. Notify notifications service 120 can notify client devices of other users having access to the same content item of the presence of the user of client device 150 with respect to the content item. Content management system 110 (e.g., event service 118) and/or client device 150 can track user interactions with content, such as read or write events, and maintain a history of such events and interactions for a user (e.g., events 143).

Content management system 110 can report a history of user interactions with a shared content item. Collaboration content management service 126 can query data sources such as events 143, metadata database 146, and server file journal 148 to determine that a user has saved the content item, that a user has yet to view the content item, etc., and disseminate this status information using notification service 117 to other users so that they can know who currently is or has viewed or modified the content item.

Collaboration content management service 126 can facilitate comments associated with content, even if a content item does not natively support commenting functionality. Such comments can be stored in metadata database 146.

Collaboration content management service 126 can originate and transmit notifications for users. For example, a user can mention another user in a comment and Collaboration content management service 126 can send a notification to that user that he has been mentioned in the comment. Various other content item events can trigger notifications, including deleting a content item, sharing a content item, etc.

Collaboration content management service 126 can provide a messaging platform whereby users can send and receive instant messages, voice calls, emails, etc.

Collaboration Content Items

Collaboration content management service 126 can also provide an interactive content item collaboration platform whereby users can simultaneously create collaboration content items, comment in the collaboration content items, and manage tasks within the collaboration content items. Collaboration content items can be files that users can create and edit using a collaboration content item editor, and can contain collaboration content item elements. Collaboration content item elements may include a collaboration content item identifier, one or more author identifiers, collaboration content item text, collaboration content item attributes, interaction information, comments, sharing users, etc. Collaboration content item elements can be stored as database entities, which allows for searching and retrieving the collaboration content items. Multiple users may access, view, edit, and collaborate on collaboration content items at the same time or at different times. In some embodiments this can be managed by requiring two users access a content item through a web interface and there they can work on the same copy of the content item at the same time.

Collaboration Companion Interface

In some embodiments client collaboration service 160 can provide a native application companion interface for the purpose of displaying information relevant to a content item being presented on client device 150. In embodiments wherein a content item is accessed by a native application stored and executed on client device 150, where the content item is in a designated location of the file system of client device 150 such that the content item is managed by content application 152, the native application may not provide any native way to display the above addressed collaboration data. In such embodiments, client collaboration service 160 can detect that a user has opened a content item, and can provide an overlay with additional information for the content item, such as collaboration data. For example, the additional information can include comments for the content item, status of the content item, activity of other users previously or currently viewing the content item. Such an overlay can warn a user that changes might be lost because another user is currently editing the content item.

In some embodiments, one or more of the services or storages/databases discussed above can be accessed using public or private application programming interfaces.

Certain software applications can access content storage 142 via an API on behalf of a user. For example, a software package such as an application running on client device 150, can programmatically make API calls directly to content management system 110 when a user provides authentication credentials, to read, write, create, delete, share, or otherwise manipulate content.

A user can view or manipulate content stored in a user account via a web interface generated and served by web interface service 124. For example, the user can navigate in a web browser to a web address provided by content management system 110. Changes or updates to content in the content storage 160 made through the web interface, such as uploading a new version of a content item, can be propagated back to other client devices associated with the user's account. For example, multiple client devices, each with their own client software, can be associated with a single account and content items in the account can be synchronized between each of the multiple client devices.

Client device 150 can connect to content management system 110 on behalf of a user. A user can directly interact with client device 150, for example when client device 150 is a desktop or laptop computer, phone, television, internet-of-things device, etc. Alternatively or additionally, client device 150 can act on behalf of the user without the user having physical access to client device 150, for example when client device 150 is a server.

Some features of client device 150 are enabled by an application installed on client device 150. In some embodiments, the application can include a content management system specific component. For example, the content management system specific component can be a stand-alone application 152, one or more application plug-ins, and/or a browser extension. However, the user can also interact with content management system 110 via a third-party application, such as a web browser, that resides on client device 150 and is configured to communicate with content management system 110. In various implementations, the client-side application 152 can present a user interface (UI) for a user to interact with content management system 110. For example, the user can interact with the content management system 110 via file system extension 153 integrated with the file system or via a webpage displayed using a web browser application.

In some embodiments, client application 152 can be configured to manage and synchronize content for more than one account of content management system 110. In such embodiments client application 152 can remain logged into multiple accounts and provide normal services for the multiple accounts. In some embodiments, each account can appear as folder in a file system, and content items within that folder can be synchronized with content management system 110. In some embodiments, client application 152 can include a selector to choose one of the multiple accounts to be the primary account or default account.

While content management system 110 is presented with specific components, it should be understood by one skilled in the art, that the architectural configuration of system 100 is simply one possible configuration and that other configurations with more or fewer components are possible. Further, a service can have more or less functionality, even including functionality described as being with another service. In addition, in some embodiments, some portions or components of content management system 110 described herein may be included in or integrated with one or more client devices 150. Moreover, features described herein with respect to an embodiment can be combined with features described with respect to another embodiment.

While system 100 is presented with specific components, it should be understood by one skilled in the art, that the architectural configuration of system 100 is simply one possible configuration and that other configurations with more or fewer components are possible.

Figure 2:
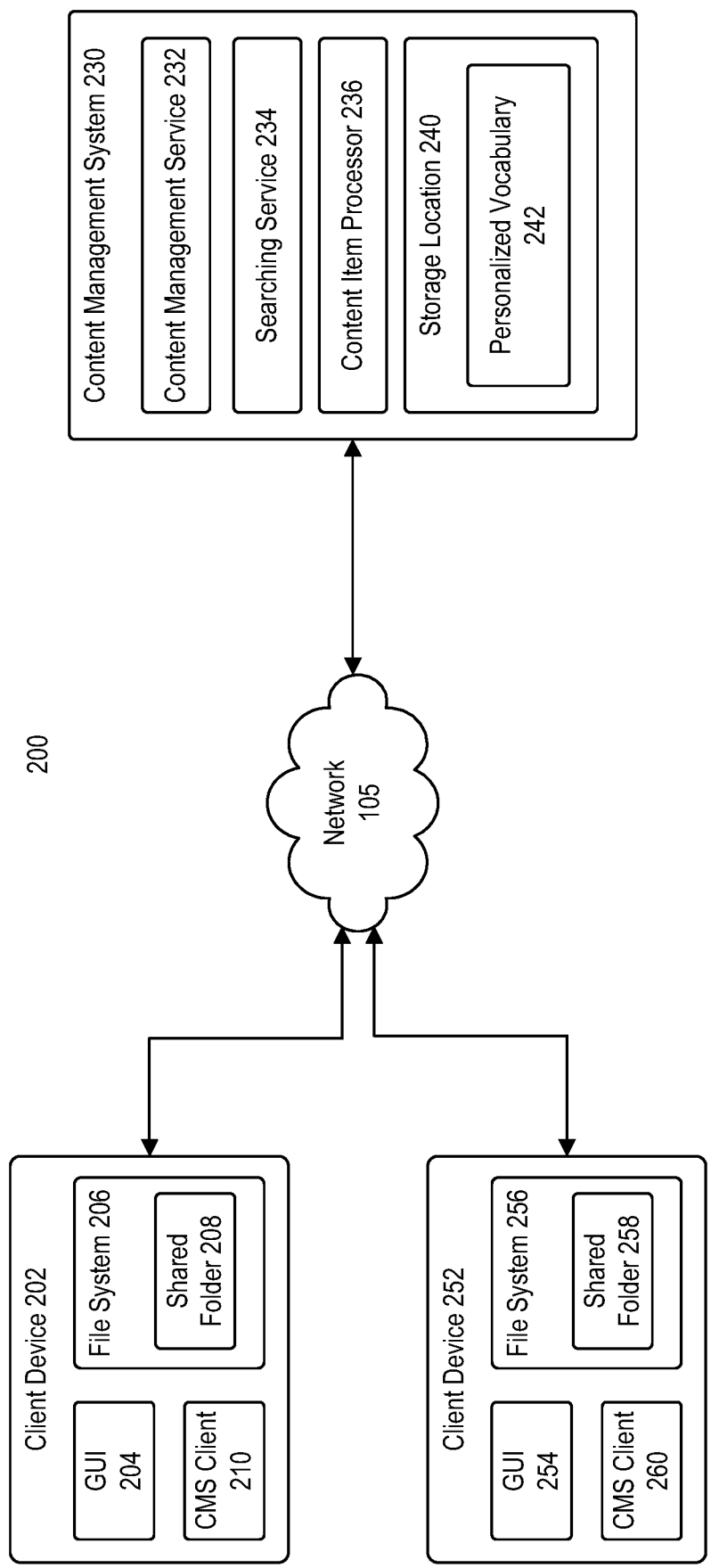
FIG. 2 illustrates an example system configuration of the content management system and client devices of FIG. 1, according to example embodiments.

FIG. 2 is a block diagram of an example system 200, according to example embodiments. For example, system 200 may correspond to system 100 described above. As illustrated, system 200 may include client device 202, client device 252 and content management system 230 communicating via network 205 (similar to network 105).

A user of client device 202 (e.g., client device 150) may create an account with content management system 110. Client device 202 may include a graphical user interface (GUI) 204, a file system 206, and a content management system (CMS) client 210. User of client device 202 may view one or more content items (e.g., files, links, folders, workspaces, etc.) associated with the user's account via GUI 204. For example, GUI 204 may provide user of client device 202 with access to content items associated with the user's account. In some embodiments, GUI 204 may provide a file structure overview. Via GUI 204, user of client device 202 may view, edit, modify, and otherwise interact with content items.

In some implementations, client device 202 may include file system 206. For example, file system 206 may be representative of a portion (e.g., a dedicated folder) of the file system of client device 202 that includes content items being managed by content management system 110. In some embodiments, content items stored in file system 206 may be automatically uploaded to or synchronized with file systems in content management system 110 and/or managed file systems on other user devices (e.g., client device 252). As illustrated, in some embodiments, file system 206 may include shared folder 208. Shared folder 208 may be accessed by a user of client device 202, as well as collaborators of the user.

In some implementations, client device 202 may further include CMS client 210. For example, CMS client 240 (referenced to as content item synchronization service 154) may manage file system 206. When a user adds a content item to file system 206, CMS client 210 may communicate with content management system 230 to synchronize the content item with content management system 230, as described with reference to FIG. 1 above. Similarly, CMS client 210 may monitor items in file system 206 to determine when content items may have been opened, modified, moved, shared, deleted, etc., and which user has performed or is performing operations on the content items within file system 206.

In some implementations, user of client device 202 may share access to a content item with a user of client device 252. In some embodiments, client device 252 may belong to the same user as client device 202. For example, client device 252 may be a user's mobile device, while client device 202 may be the user's desktop or laptop device. In some embodiments, client device 252 may belong to a different user. Client device 252 may be configured similar to client device 202. Client device 252 may include GUI 254, file system 256, and CMS client 260.

User of client device 252 may view one or more files, links, folders, workspaces, etc., associated with the user's account via GUI 254. Via GUI 254, user of client device 252 may view, edit, modify, and otherwise interact with the content items.

In some implementations, client device 252 may include file system 256. For example, file system 256 may be representative of a portion of the file system of client device 252 managed by content management system 110. In some embodiments, content items stored in file system 256 may be automatically uploaded to or synchronized with file systems in content management system 110 and/or managed file systems on other user devices (e.g., user device 202). As illustrated, in some embodiments, file system 256 may include shared folder 258. Shared folder 258 may be accessed by a user of client device 252, as well as collaborators of the user.

In some implementations, client device 252 may further include CMS client 260. For example, CMS client 260 (referenced to as content item synchronization service 154) may manage file system 256. When a user adds a content item to file system 256, CMS client 260 may communicate with content management system 230 to synchronize the content item with content management system 230, as described with reference to FIG. 1 above. Similarly, CMS client 260 may monitor items in file system 206 to determine content items may have been opened, modified, moved, shared, deleted, etc., and which user has or is performing operations on the content items within file system 206.

Content management system 230 may include CMS service 232, searching service 234, content item processor 236, and storage location 240. CMS service 232 may be representative of one or more modules discussed above in reference to FIG. 1. For example, CMS service 232 may track a user's interaction with content items associated with the user's account. In some embodiments, the interactions may include, but are not limited to, editing, adding, posting, sharing, deleting, commenting, moving, renaming, and otherwise interacting with or manipulating the content items. Using a specific example, CMS service 232 may track when a user adds a content item to a folder, edits a content item, shares a content item (e.g., a folder or a file) with another user, deletes a content item (e.g., a file or folder), shares a link to a content item, and the like. In some embodiments, CMS service 232 may generate an event for each such interaction. For example, when CMS service 232 detects a user interaction with content associated with the user's account, CMS service 232 may create a unique event identifier and event type, and associate the event identifier and event type with the user to create an event or event record for the interaction. In some embodiments, CMS service may associate event identifier and event type with a user identifier and/or namespace identifier associated with the user. CMS service 232 may store each event or event record in storage location 240.

Although CMS service 232, searching service 234, and content item processor 236 are discussed as components of content management system 230, those skilled in the art recognize that CMS service 232, searching service 234, and/or content item processor 236 may also be a component of client device 252. In other words, the operations discussed with respect to CMS service 232, searching service 234, and content item processor 236 may be performed remotely at content management system 230 and/or locally at client device 252.

Searching service 234 may be configured to handle search queries from client device 202 or client device 252. Via an actionable element on GUI 204 or GUI 254, a user associated with client device 202 or client device 252, respectively, may request searching service 234 to execute a query against the user's namespace. Searching service 234 may execute the query against the user's namespace, by searching storage location 240 to identify potential search results based on the query and the user's namespace. In other words, searching service 234 may execute the query to determine which content items associated with the user are relevant to the query.

In some embodiments, searching service 234 may not be able to return results to the user because of an error associated with the query. For example, if a user misspells a term in the search request, searching service 234 may query storage location 240 based on the misspelled term, which may not return any results (i.e., due to the misspelled term). To reduce the number of search requests that a user may submit and to increase the quality of search results, searching service 234 may utilized a personalized vocabulary 242 for searching against a user's namespace.

Personalized vocabulary 242 may be generated by content item processor 236 and stored in storage location 240. Personalized vocabulary 242 may be used to verify and/or correct search terms in a user's search request.

Content item processor 236 may be configured to generate and maintain personalized vocabulary 242. Content item processor 236 may generate personalized vocabulary 242 for each user based on content items associated with a user's namespace. To generate personalized vocabulary 242, content item processor 236 may parse some, all, or substantially all content item associated with a user's namespace and index some, all, or substantially all terms and/or phrases contained in the content items. For example, content item processor 236 may parse all or substantially all content items of certain file types, such as all or substantially all content items that contain readable text (either in plain text form or in a format that can be decoded by content item processor 236). Put differently, in some embodiments content item processor 236 may parse all or substantially all content items, except files of certain types or formats, such as content items that do not contain readable text or are not parseable (e.g., whose format is not supported by content item processor 236).

Content item processor 236 may index some, all or substantially all words and/or phrases identified in the parsed user's content items based on a frequency of occurrence.

In some embodiments, indexing some, all or substantially all word and/or phrase identified in the parsed user's content items may include storing information associated with some, all or substantially all word and/or phrase. For example, in some embodiments, parsing some, all, or substantially all content items associated with the user's namespace may include maintaining a location of each term and/or phrase identified in the parsed content item within the namespace. In some embodiments, content item processor 236 may maintain a path location of some, all or substantially all words and/or phrases associated with the user's namespace. For example, content item processor 236 may determine that the term "snippet" appears 30 times across the user's namespace; 20 times within Folder A of Workspace 1 and 10 times within Folder B of Workspace 2. By maintaining the path location of some, all or substantially all word and/or phrase associated with the user's namespace, content item processor 236 may maintain a ranking of terms and/or phrases globally (i.e., across the user's namespace) as well as locally (e.g., within a workspace or folder).

In another example, in some embodiments, parsing some, all or substantially all content items associated with the user's namespace may include determining a date associated with some, all or substantially all word and/or phrase identified in the parsed content items. Maintaining the date associated with some, all or substantially all words and/or phrases may aid in determining those words and/or phrases that are most pertinent to the user based on recency of use.

In some embodiments, parsing some, all, or substantially all content items associated with the user's namespace may include parsing some, all, or substantially all content items in namespaces linked to the user's namespace. CMS service 232 may support the linking of namespaces. In some embodiments, a user may link a first account (e.g., a first namespace) to a second account (e.g., a second namespace). In an exemplary case, a user may link their personal account (e.g., a personal namespace) with their business/work account (e.g., a business/work namespace). Accordingly, in some embodiments, content item processor 236 may be configured to process content items associated with other namespaces linked to the user's namespace.

In some embodiments, parsing some, all, or substantially all content items associated with the user's namespace may include determining a device from which the user uploaded and/or modified a content item. For example, indexing some, all or substantially all word and/or phrase identified in the parsed user's content items may include storing information the device type (e.g., tablet, laptop, mobile device, desktop, etc.) associated with some, all or substantially all words and/or phrases.

Content item processor 236 may further be provided to maintain personalized vocabulary 242 based on events or event records associated with the user's name space. For example, when CMS service 232 detects a user interaction with content associated with the user's account, CMS service 232 may create a unique event identifier and event type, and associate the event identifier and event type with the user to create an event or event record for the interaction. In some embodiments, CMS service may associate event identifier and event type with a user identifier and/or namespace identifier associated with the user. CMS service 232 may store each event or event record in storage location 240. Upon determining that an event or event record has been added to storage location 240, content item processor 236 may parse the associated content item to determine whether words and/or terms were added and/or removed from a content item. In some embodiments, upon determining that words and/or terms were added to a content item, content item processor 236 may index those words and/or terms in personalized vocabulary 242. In some embodiments, upon determining that words and/or terms were removed from a content item, content item processor 236 may re-index personalized vocabulary 242. For example, upon determining that there are now fewer recitations of a term recited in user's content items, content item processor 236 may update the frequency count for that term. In some embodiments, content item processor 236 may not re-index personalized vocabulary based on removed terms and/or phrases. By continually updating personalized vocabulary 242, content item processor 236 may maintain an up-to-date index of the user's words and/or phrases.

As shown, personalized vocabulary 242 may be stored in storage location 240. Personalized vocabulary 242 may be representative of a data structure comprising an index of terms and/or phrases used in content items associated with the user's namespace. In some embodiments, personalized vocabulary 242 may be sorted by the frequency of terms and/or phrases. In some embodiments, personalized vocabulary 242 may include a sub-personalized vocabulary for each folder, workspace, and/or content item associated with the namespace. In this manner, searching service 234 may leverage personalized vocabulary 242 globally across a user's namespace and locally within a folder, workspace, and/or content item.

In operation, searching service 234 may use personalized vocabulary 242 to verify the user's search request. Upon receiving a search request from client device 202 or client device 252, searching service 234 may verify the user's search request against personalized vocabulary 242 before querying storage location 240 for results. Verifying the user's search request may reduce the time it takes the user to search their namespace by correcting potential typos or misspellings in the search request and providing suggested search terms to the user.

FIG. 3A is a block diagram 300 illustrating an exemplary process for maintaining a personalized vocabulary, according to example embodiments. As shown, CMS service 232 may detect a user interacting (illustrated as 301) with content item 302. In some embodiments, a user interacting 301 with content item 302 may include the user (e.g., client device 202) uploading content item 302 to content management system 230. In some embodiments, client device 202 interacting 301 with content item 302 may include client device 202 creating a new content item. In some embodiments, client device 202 interacting 301 with content item 302 may include client device 202 deleting a content item 302 from content management system 230. In some embodiments, client device 202 interacting 301 with content item 302 may include client device 202 modifying or editing content item 302. In some embodiments, client device 202 interacting 301 with content item 302 may include client device 202 moving content item 302 within the underlying folder structure of the user's namespace (e.g., from folder 1 to folder 2). In some embodiments, CMS service 232 may detecting an interaction 301 with content item 302 when a collaborator (e.g., client device 252) with the user (e.g., client device 202) modifies content item 302, which is shared with both a user of client device 202 and a user of client device 252. CMS client 232 may create an event or event record associated with interaction 301. CMS client 232 may store the event or event record in storage location 240 associated with the user's namespace.

In some embodiments, content item processor 236 may monitor storage location 240 for new events or event records created by CMS service 232. In some embodiments, CMS service 232 may activate content item processor 236 upon creating an event or event record. In some embodiments, content item processor 236 may be configured to parse storage location 240 periodically, to identify new event or event records created by CMS service 232. Upon determining that a new event or event record exists, content item processor 236 may analyze the interaction that triggered CMS service 232 to create an event or event record. For example, if the interaction that triggered the event or event record is client device 202 uploading content item 302 to content management system 230, content item processor 236 may parse content item 302 to index some, all or substantially all terms and/or phrases contained therein. In another example, if the interaction that triggered the event or event record is client device 202 modifying content item 302 in content management system 230, content item processor 236 may parse event and/or event record to identify any changes in content item 302. Content item processor 236 may update personalized vocabulary 242 associated with client device 202 accordingly.

FIG. 3B is a block diagram 350 illustrating an exemplary process for processing a search request, according to example embodiments. Client device 202 may submit search request 304 to searching service 234. As illustrated, searching service 234 may include a processor 306 and ranking model 308. Processor 306 may be configured to process search requests received from client device 202.

Single Term Search Request

In some embodiments, search request 304 may be representative of a single term search request. To process search request 304, processor 306 may query storage location 240 to determine if the term in search request 304 occurs at least a threshold number of times in personalized vocabulary 242. In some embodiments, a threshold number of times may include at least one time. Determining whether the term in search request 304 occurs at least the threshold number of times provides a sense of confidence that the term is not a typo or misspelling. If processor 306 determines that the term occurs at least the threshold number of times in personalized vocabulary 242, then searching service 234 may query storage location 240 using the search term. If, however, processor 306 determines that the term does not occur at least the threshold number of times, processor 306 may generate a corrected search suggestion 310 for the user. To generate the corrected search suggestion 310, processor 306 may generate a plurality of search term options for what the user may have meant to use, based on personalized vocabulary 242.

In some embodiments, processor 306 may identify a prefix of the search term. Using a specific example, assume the search term submitted by client device 202 was "basetball." In some embodiments, processor 306 may determine that the prefix of the search team is "b." Using the prefix, processor 306 may identify a plurality of terms in personalized vocabulary 242 that include the same prefix. In other words, continuing with the above example, processor 306 may identify a plurality of terms in personalized vocabulary 242 that begin with the letter "b." Processor 306 may generate a data set corresponding to the plurality of search term options. For example, an exemplary data set may include [basketball, basketballs, baseball, baseballs, basket, base, ..., etc.]. The data set may include a plurality of terms in personalized vocabulary 242 that has the same prefix.

After the data set is generated, processor 306 may utilize ranking model 308 to determine at least one corrected search suggestion 310 to provide to the user. Ranking model 308 may be representative of a model that ranks each of the search term options based on a variety of variables. In some embodiments, ranking model 308 may rank each of the search term options based on their frequency of occurrence in personalized vocabulary 242. In some embodiments, ranking model 308 may rank each of the search term options based on their edit distances from the search term. In some embodiments, ranking model 308 may rank each of the search term options based on a data associated with their generation. For example, ranking model 308 may rank option A ahead of option B because of the recency of occurrences of option A compared to option B in personalized vocabulary 242. In some embodiments, ranking model 308 may rank each of the search term options based on their location within the user's namespace. For example, a user constrained the search request to content items in Folder 1, ranking model 308 may rank occurrences of a term in Folder 1 more heavily than occurrences of a term not in Folder 1.

Based on the ranking, searching service 234 may present a corrected search suggestion 310 to the user. In some embodiments, searching service 234 may present a single corrected search suggestion 310. In some embodiments, searching service 234 may present at least two corrected search suggestions 310. In some embodiments, searching service 234 may generate an actionable link for each corrected search suggestion 310. For example, a user may click on the corrected search suggestion 310, which would trigger a search request of that corrected search suggestion 310 from client device 202 to searching service 234.

Multi-term Search Request

In some embodiments, search request 304 may be representative of a multi-term search request. In other words, search request 304 may include at least two terms. To process search request 304, processor 306 may query storage location 240 to determine if each term in search request 304 occurs at least a threshold number of times in personalized vocabulary 242. In some embodiments, a threshold number of times may include at least one time. Determining whether each term in search request 304 occurs at least the threshold number of times provides a sense of confidence that each term is not a typo or misspelling. If processor 306 determines that each term occurs at least the threshold number of times in personalized vocabulary 242, then searching service 234 may query storage location 240 using the search term. If, however, processor 306 determines that at least one term does not occur at least the threshold number of times, processor 306 may generate a corrected search suggestion 310 for the user for the term that does not occur the threshold number of times. To generate the corrected search suggestion 310, processor 306 may generate a plurality of search term options for what the user may have meant to use, based on personalized vocabulary 242.

In some embodiments, processor 306 may identify a prefix of the search term. Using a specific example, assume the search term submitted by client device 202 was "baset-ball game." As those skilled in the art recognize, "game" is spelled correctly. For purposes of the example, assume that "game" occurs at least the threshold number of times. Accordingly, processor 306 may determine that the prefix of the search team "basetball" is "b." Processor 306 does not need to perform similar operations on "game" because "game" is assumed to have occurred at least the threshold number of times. Using the prefix, processor 306 may identify a plurality of terms in personalized vocabulary 242 that include the same prefix. In other words, continuing with the above example, processor 306 may identify a plurality of terms in personalized vocabulary 242 that begin with the letter "b." Processor 306 may generate a data set corresponding to the plurality of search term options. For example, an exemplary data set may include [basketball, basketballs, baseball, baseballs, basket, base, ..., etc.]. The data set may include a plurality of terms in personalized vocabulary 242 that has the same prefix.

After the data set is generated, processor 306 may utilize ranking model 308 to determine at least one corrected search suggestion 310 to provide to the user. Ranking model 308 may be representative of a model that ranks each of the search term options based on a variety of variables. In some embodiments, ranking model 308 may rank each of the search term options based on their frequency of occurrence in personalized vocabulary 242. In some embodiments, ranking model 308 may rank each of the search term options based on their edit distances from the search term. In some embodiments, ranking model 308 may rank each of the search term options based on a data associated with their generation. In some embodiments, ranking model 308 may rank each of the search term options based on their location within the user's namespace.

Figure 4A:
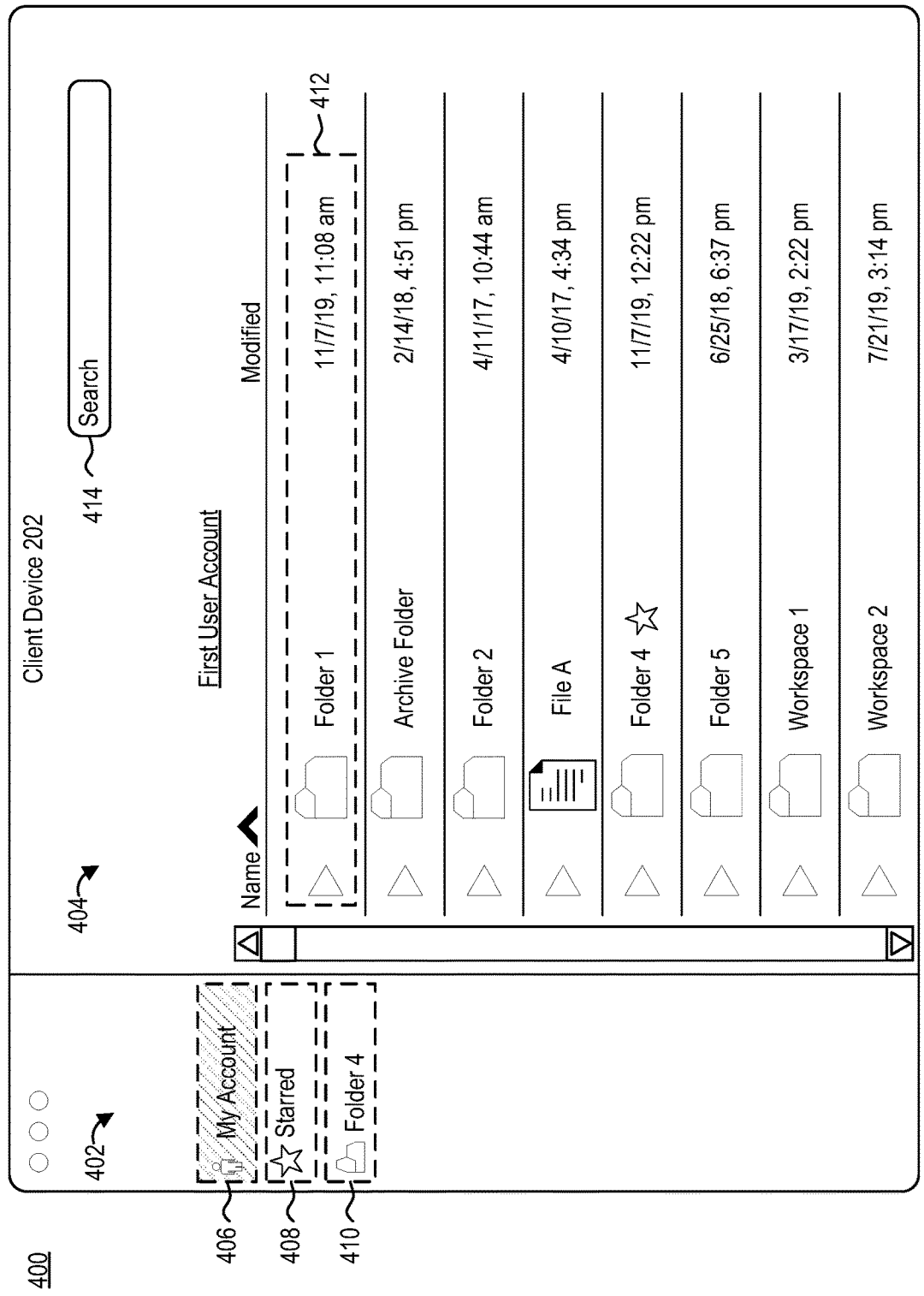
FIG. 4A illustrates an example view of a graphical user interface presenting a user's homepage, according to example embodiments.

Based on the ranking, processor 306 may then add the search terms together and search personalized vocabulary for each phrase. For example, processor 306 may generate an exemplary data set that may include: [basketball game, basketballs game, baseball game, baseballs game, basket game, base game, game basketball, game basketballs, game baseball, game baseballs, game basketball, game, base, etc.]. Processor 306 may compare each phrase in the exemplary data set to personalized vocabulary 242 to determine a number of occurrences of each phrase. Continuing with the above example, processor 306 may determine that "basketball game" occurs 40 times in personalized vocabulary 242 and "baseball game" occurs 20 times in personalized vocabulary 242. Accordingly, searching service 234 may present at least "basketball game" to the user as a corrected search suggestion 310. FIG. 4A illustrates an example view of a graphical user interface 400 presenting a user's homepage with content management system 110, according to example embodiments. Graphical user interface 400 (hereinafter "GUI 400") may correspond to GUI 204 and/or GUI 254 of FIG. 2. In some embodiments, GUI 400 may be a web page presented in a web browser application of client device 150. In some embodiments, GUI 400 may be a graphical user interface generated by a native software application executing on client device 150.

As illustrated, GUI 400 may correspond to a homepage associated with a user's account. GUI 400 may include a first portion 402 and a second portion 404. First portion 402 of GUI 400 may correspond to a navigation pane of GUI 400. First portion 402 may include one or more graphical elements 406-410 (e.g., button, link, etc.) selectable by the user to cause GUI 400 (e.g., the browser or native application) to send a message to content management service requesting information associated with each graphical element 406-410.

Graphical element 406 may correspond to the user's account. Accordingly, upon receiving input via graphical element 406, GUI 400 may request, from content management system 116, all content associated with the user's account. Content management service 116 may deliver the content to GUI 400 so that GUI 400 may display the content on the display associated with client device 150.

Graphical element 408 may correspond to starred content. Starred content may correspond to content that the user has designated as "favorite." Accordingly, upon receiving input via graphical element 408, GUI 400 may request, from content management system 116, starred content associated with the user's account. Content management service 116 may deliver the content to GUI 400 so that GUI 400 may display the content on the display associated with client device 150.

Graphical element 410 may correspond to a folder. A folder may correspond to a storage space in the user's account. In some embodiments, the folder may include content associated therewith. According, upon receiving input via graphical element 410, GUI 400 may request, from content management system 116, all content associated with (or stored in) the selected folder. Content management service 116 may deliver the folder's content to GUI 400 so that GUI 400 may display the content on the display associated with client device 150

Second portion 404 may correspond to a display section of GUI 400. For example, upon the user interacting with graphical element 406, graphical element 408, or graphical element 410, GUI 400 may display content associated with the selection in second portion 404. Second portion 404 may include one or more content items 412. As illustrated, user of client device 150 may have interacted with graphical element 406 corresponding to the user's account. Accordingly, second portion 404 may include one or more content items 412 associated with the user's account.

In some embodiments, second portion 404 may include at least graphical element 414. Graphical element 414 may correspond to search bar. Via graphical element 414, a user can submit search requests to content management system 110.

Figure 4B:
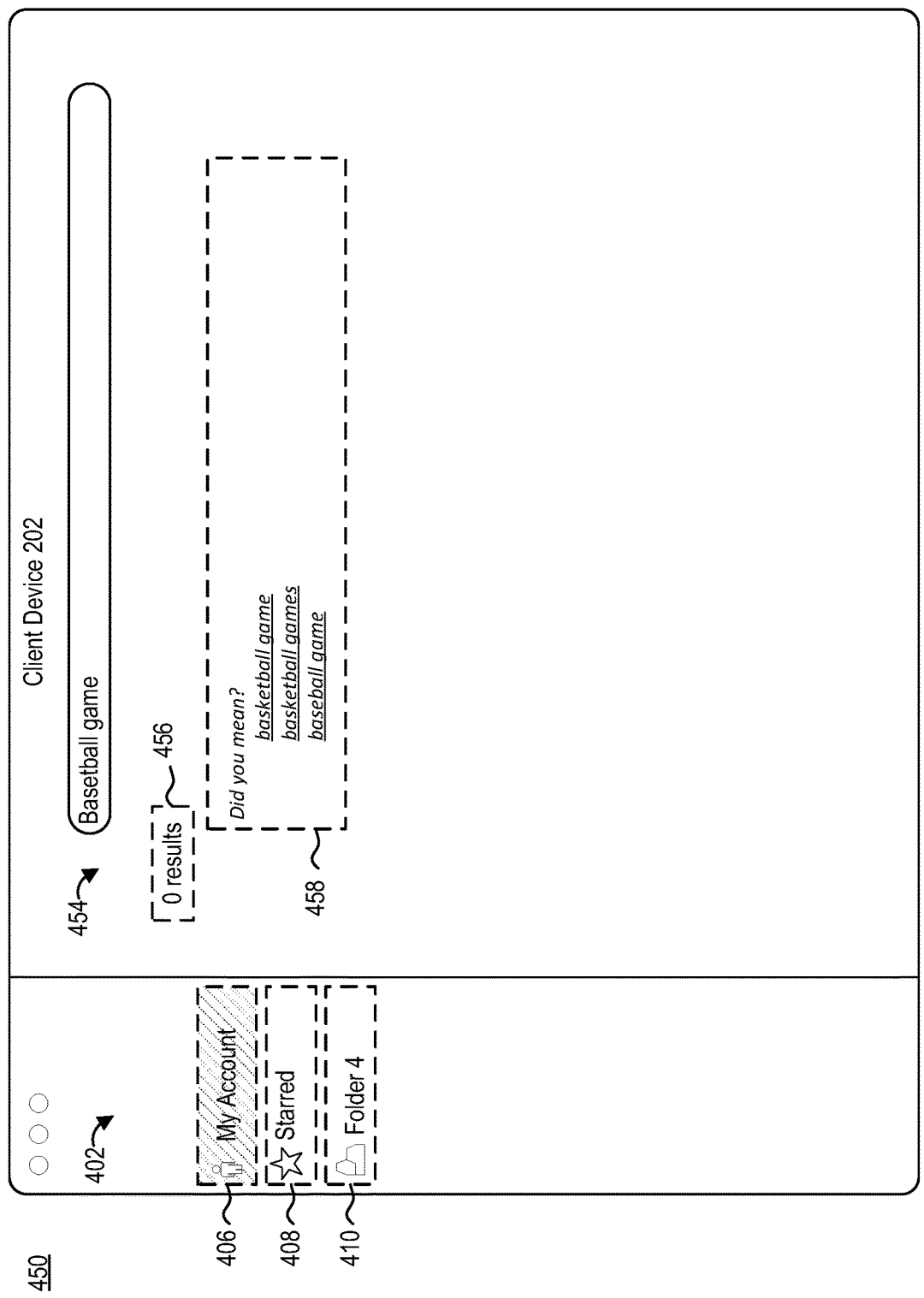
FIG. 4B illustrates an example view of a graphical user interface presenting a corrected search suggestion, according to example embodiments.

FIG. 4B illustrates an example view of a graphical user interface 450 presenting a search results page, according to example embodiments. Graphical user interface 450 (hereinafter "GUI 450") may correspond to GUI 204 and/or GUI 254 of FIG. 2. In some embodiments, GUI 450 may be a web page presented in a web browser application of client device 150. In some embodiments, GUI 450 may be a graphical user interface generated by a native software application executing on client device 150.

As illustrated, GUI 450 may include second portion 454 corresponding to a search results view, when a user submits a search request via graphical element 414 of GUI 400. Graphical element 414 may include the search term or phrase entered by the user. For example, as illustrated, a user may have submitted a search request for "Baseball game." Based on the operations discussed above in conjunction with FIG. 3A, searching service 234 may have generated a set of corrected search suggestions to the user.

As illustrated, GUI 450 may further include graphical element 456 and graphical element 458. Graphical element 456 may be representative of a result count for the query. For example, graphical element 456 may recite "0results" when searching service 234 returns a corrected search suggestion. Graphical element 458 may be representative of a results area. In those embodiments in which a corrected search suggestion is generated, searching service 234 may present the user with corrected search suggestions via graphical element 458. In some embodiments, the corrected search suggestions may be listed by their ranking. In some embodiments, each corrected search suggestion may be presented as an actionable element. For example, upon user interaction with a graphical element corresponding to "basketball game," client device 150 may transmit a search request of "basketball game" to content management system 110.

Figure 4C:
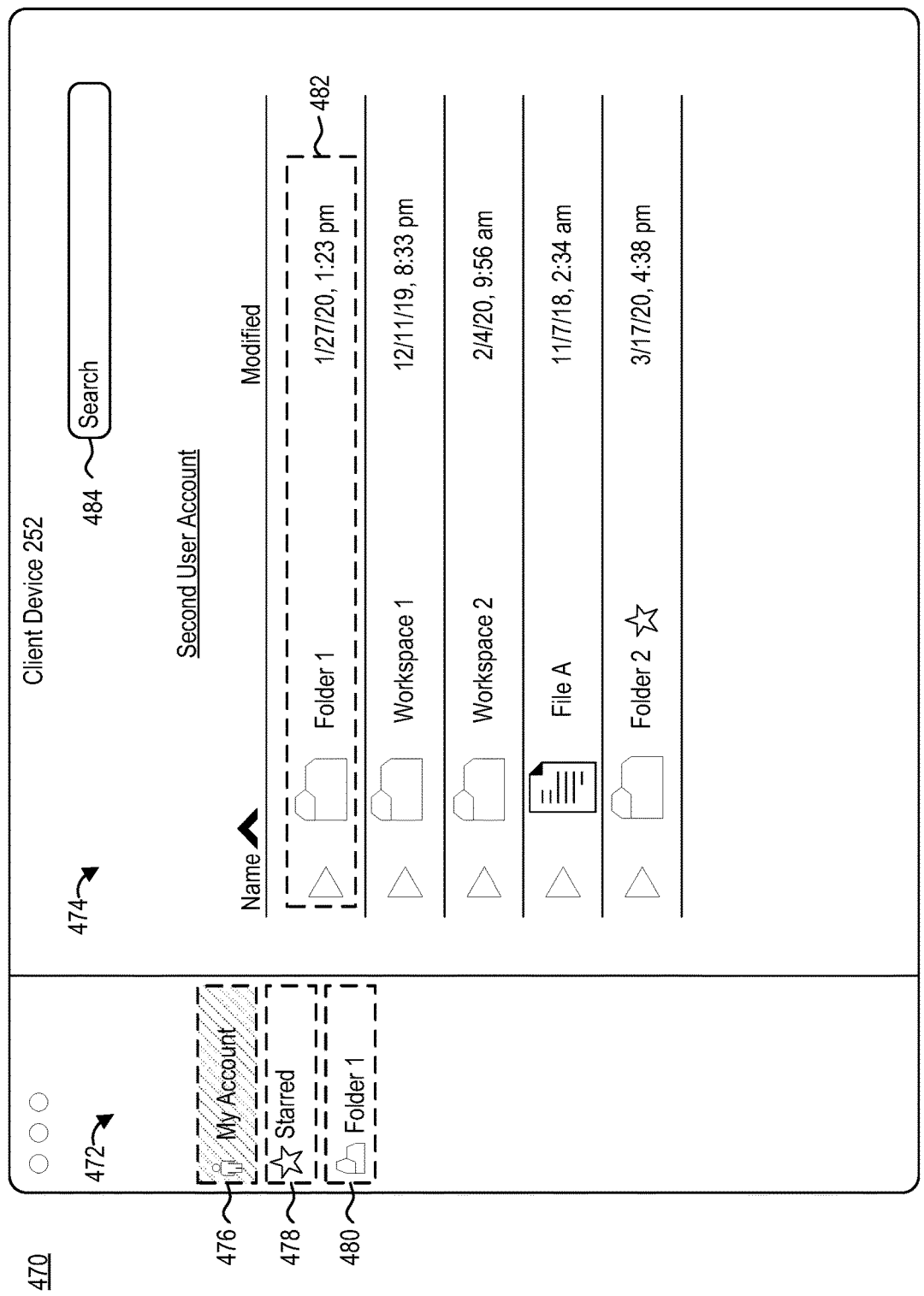
FIG. 4C illustrates an example view of a graphical user interface presenting a second user's homepage, according to example embodiments.

FIG. 4C illustrates an example view of a graphical user interface 470 presenting a second user's homepage with content management system 110, according to example embodiments. Graphical user interface 470 (hereinafter "GUI 470") may correspond to GUI 204 and/or GUI 254 of FIG. 2. In some embodiments, GUI 470 may be a web page presented in a web browser application of client device 150. In some embodiments, GUI 470 may be a graphical user interface generated by a native software application executing on client device 150.

As illustrated, GUI 470 may correspond to a homepage associated with a second user's account. GUI 470 may include a first portion 472 and a second portion 474. First portion 472 of GUI 470 may correspond to a navigation pane of GUI 470. First portion 472 may include one or more graphical elements 476-480 (e.g., button, link, etc.) selectable by the second user to cause GUI 470 (e.g., the browser or native application) to send a message to content management service requesting information associated with each graphical element 476-480.

Graphical element 476 may correspond to the second user's account. Accordingly, upon receiving input via graphical element 476, GUI 470 may request, from content management system 116, all content associated with the second user's account. Content management service 116 may deliver the content to GUI 470 so that GUI 470 may display the content on the display associated with client device 150.

Graphical element 478 may correspond to starred content. Starred content may correspond to content that the second user has designated as "favorite." Accordingly, upon receiving input via graphical element 478, GUI 470 may request, from content management system 116, starred content associated with the second user's account. Content management service 116 may deliver the content to GUI 470 so that GUI 470 may display the content on the display associated with client device 150.

Graphical element 480 may correspond to a folder. A folder may correspond to a storage space in the second user's account. In some embodiments, the folder may include content associated therewith. According, upon receiving input via graphical element 480, GUI 470 may request, from content management system 116, all content associated with (or stored in) the selected folder. Content management service 116 may deliver the folder's content to GUI 470 so that GUI 470 may display the content on the display associated with client device 150

Second portion 474 may correspond to a display section of GUI 470. For example, upon the second user interacting with graphical element 476, graphical element 478, or graphical element 480, GUI 470 may display content associated with the selection in second portion 404. Second portion 474 may include one or more content items 482. As illustrated, second user of client device 150 may have interacted with graphical element 476 corresponding to the second user's account. Accordingly, second portion 474 may include one or more content items 482 associated with the second user's account.

In some embodiments, second portion 474 may include at least graphical element 484. Graphical element 484 may correspond to search bar. Via graphical element 484, a second user can submit search requests to content management system 110.

Figure 4D:
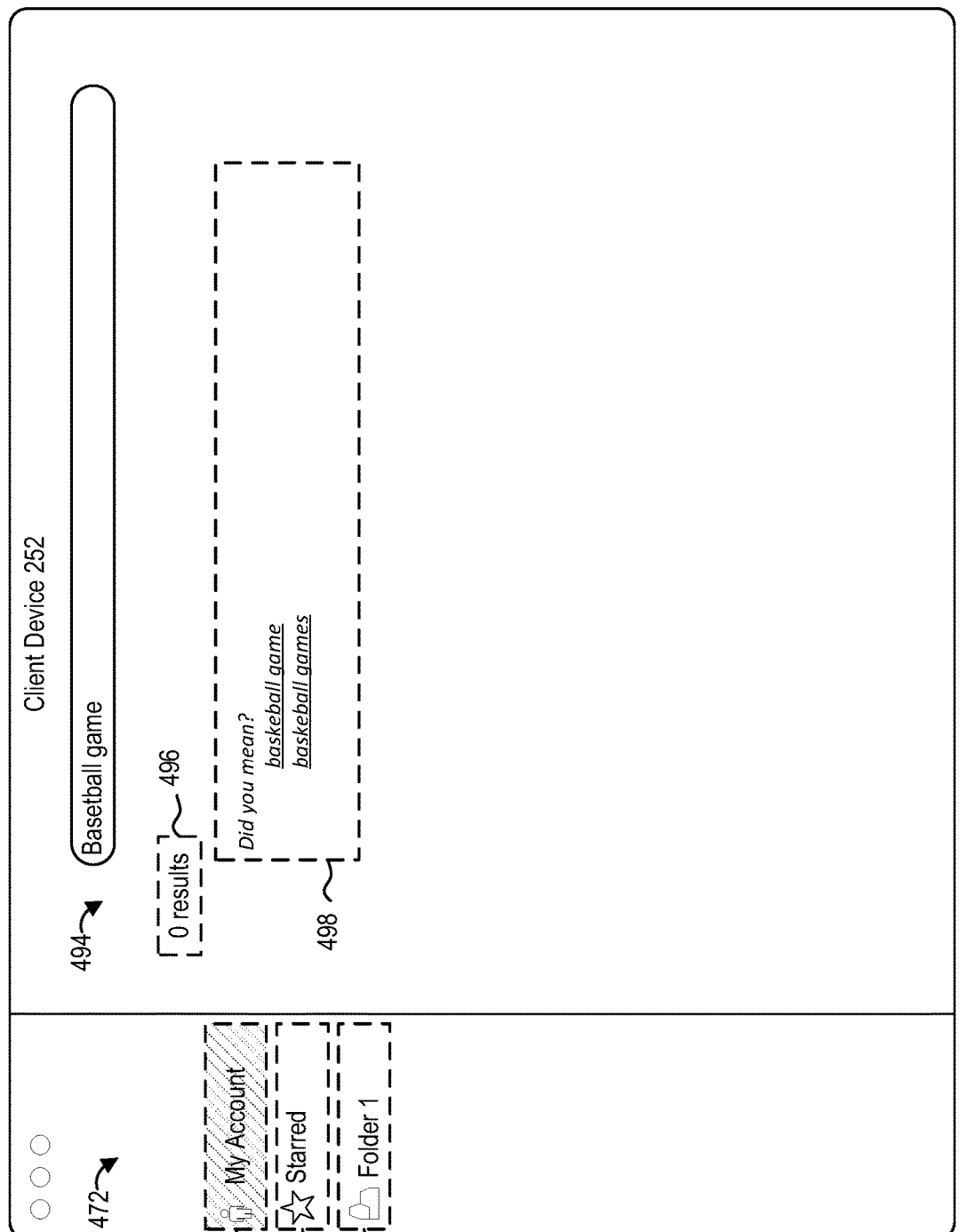
FIG. 4D illustrates an example view of a graphical user interface presenting a corrected search suggestion, according to example embodiments.

FIG. 4D illustrates an example view of a graphical user interface 490 presenting a search results page, according to example embodiments. Graphical user interface 490 (hereinafter "GUI 490") may correspond to GUI 204 and/or GUI 254 of FIG. 2. In some embodiments, GUI 490 may be a web page presented in a web browser application of client device 150. In some embodiments, GUI 490 may be a graphical user interface generated by a native software application executing on client device 150.

As illustrated, GUI 490 may include second portion 494 corresponding to a search results view, when a second user submits a search request via graphical element 484 of GUI 470. Graphical element 484 may include the search term or phrase entered by the second user. For example, as illustrated, a second user may have submitted a search request for "Baseball game." Based on the operations discussed above in conjunction with FIG. 3A, searching service 234 may have generated a set of corrected search suggestions to the second user.

As illustrated, GUI 470 may further include graphical element 496 and graphical element 498. Graphical element 496 may be representative of a result count for the query. For example, graphical element 496 may recite "0 results" when searching service 234 returns a corrected search suggestion. Graphical element 498 may be representative of a results area. In those embodiments in which a corrected search suggestion is generated, searching service 234 may present the second user with corrected search suggestions via graphical element 498. In some embodiments, the corrected search suggestions may be listed by their ranking. In some embodiments, each corrected search suggestion may be presented as an actionable element.

As illustrated, the corrected search suggestions in graphical element 498 include different corrected search suggestions from graphical element 458. This may be attributed to the search request originating from the second user instead of the first user associated with FIGS. 4A-4B. As recited above, content item processor 236 may generate personalized vocabulary 242 for each user based on content items associated with each user's name space. In other words, the personalized vocabulary for a first user (e.g., user from FIGS. 4A-4B) may be different from the personalized vocabulary generated for a second user (e.g., user from FIGS. 4C-4D). Therefore, the same search query may not trigger the same set of corrected search suggestions for two different users.

As illustrated in graphical element 458, the second user may be provided with the corrected search suggestions: "baskeball game" or "baskeball games." Although the term "baskeball" may also be spelled incorrectly, the term "baskeball" may occur at least a threshold number of times in the second user's personalized vocabulary. As such, searching service 234 may return "baskeball game" or "baskeball games" to the second user as a corrected search suggestion, based on the second user's personalized dictionary.

Figure 5A:
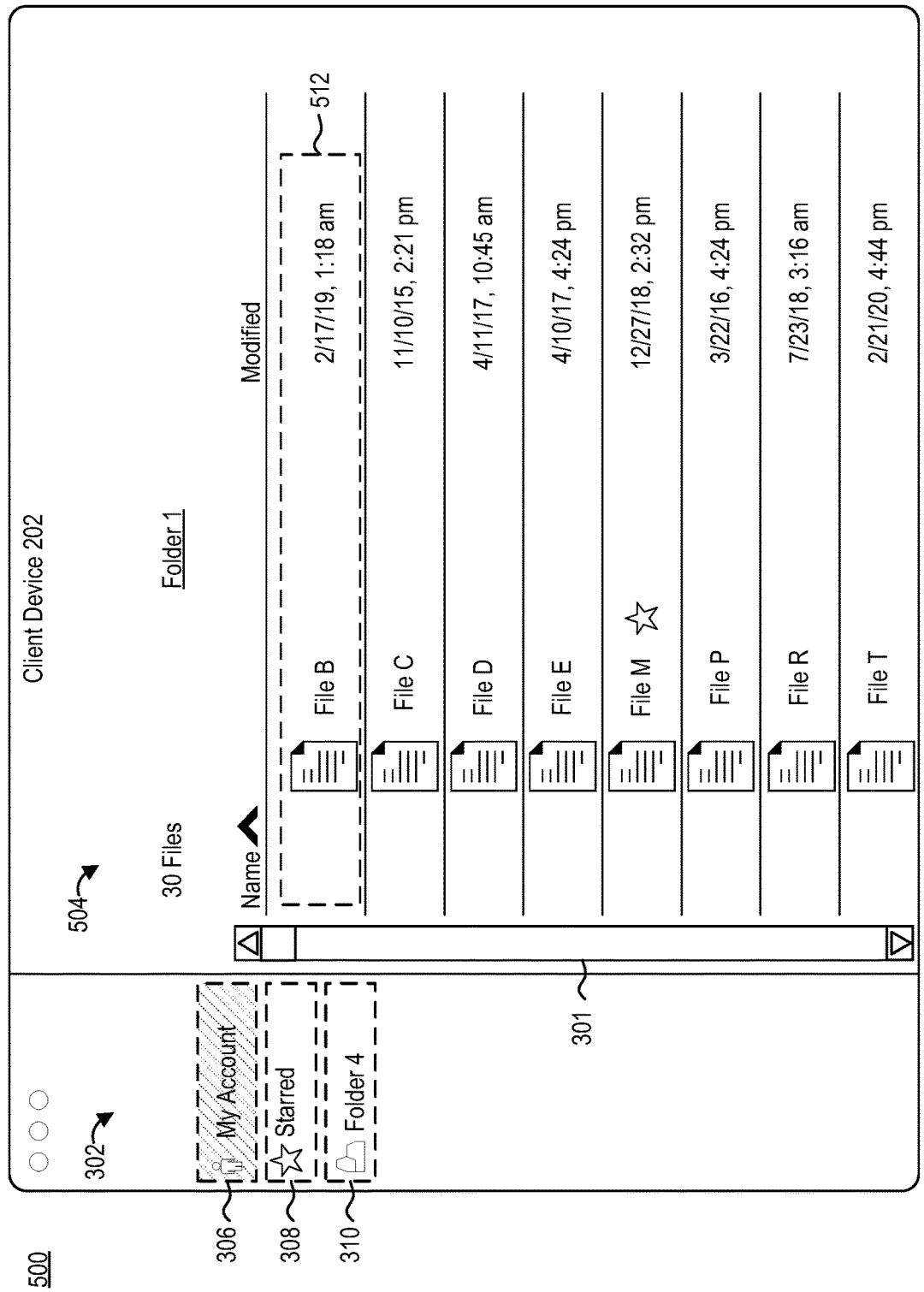
FIG. 5A illustrates an example view of a graphical user interface presenting a selected folder view, according to example embodiments.

FIG. 5A illustrates an example view of a graphical user interface 500 presenting a folder view, according to example embodiments. Graphical user interface 500 (hereinafter "GUI 500") may correspond to GUI 204 and/or GUI 254 of FIG. 2. In some embodiments, GUI 500 may be a web page presented in a web browser application of client device 150. In some embodiments, GUI 500 may be a graphical user interface generated by a native software application executing on client device 150.

As illustrated, GUI 500 may correspond to a view of Folder 1 of the user's account. As illustrated, GUI 500 may include portion 504. Portion 504 may correspond to Folder 1 of the user's account. Portion 504 may include one or more content items 512 associated with the Folder 1. In some embodiments, portion 504 may include at least graphical element 514. Graphical element 514 may correspond to search bar. Via graphical element 514, a user can submit search requests to content management system 110. In some embodiments, submitting a search request via graphical element 514, as opposed to graphical element 414, may constrain search query to Folder 1. In some embodiments, constraining the query to a specific folder or workspace may also influence the corrected search suggestions presented to the user.

Figure 5B:
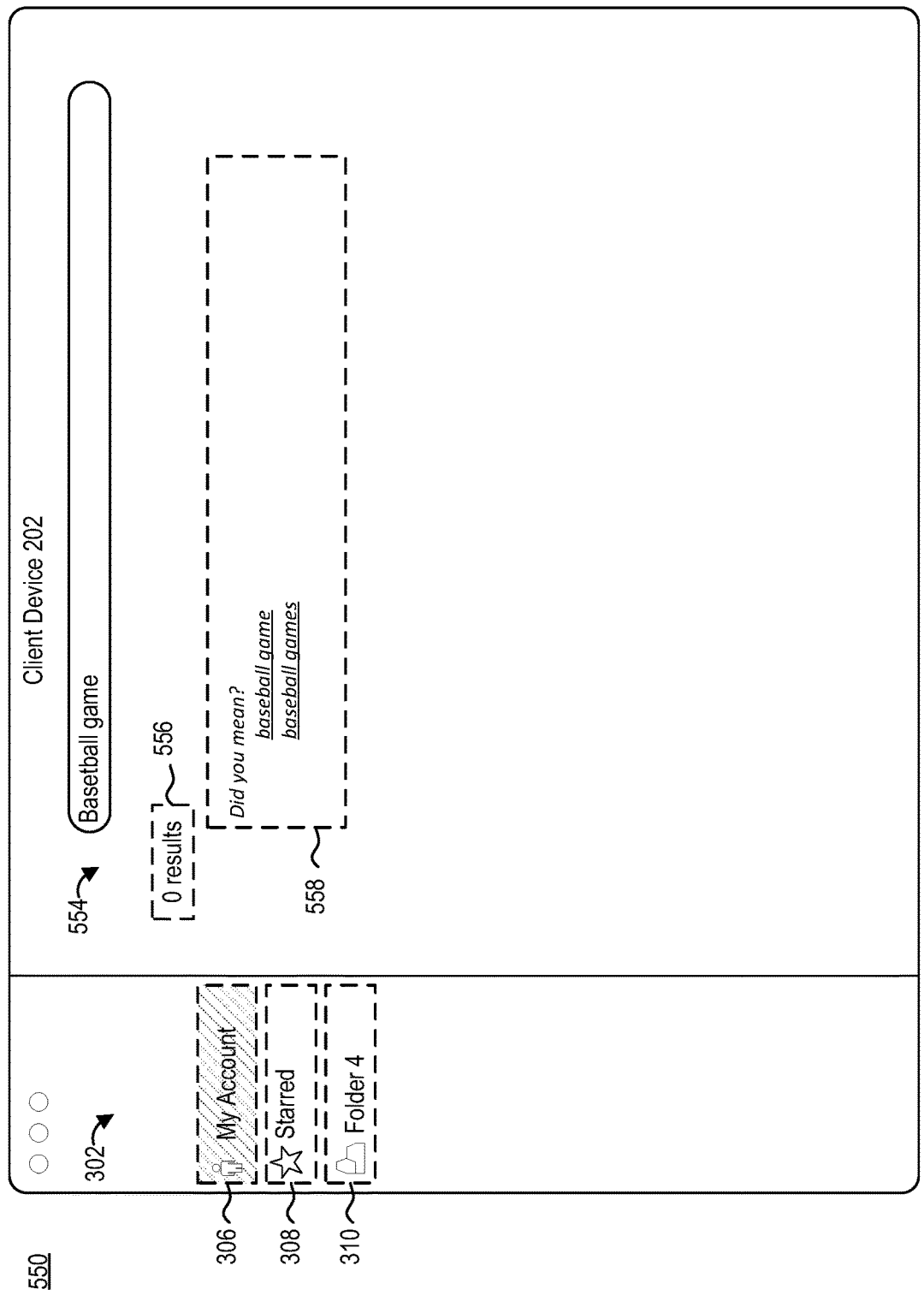
FIG. 5B illustrates an example view of a graphical user interface presenting a corrected search suggestion, according to example embodiments.

FIG. 5B illustrates an example view of a graphical user interface 550 presenting a search results page, according to example embodiments. Graphical user interface 550 (hereinafter "GUI 550") may correspond to GUI 204 and/or GUI 254 of FIG. 2. In some embodiments, GUI 550 may be a web page presented in a web browser application of client device 150. In some embodiments, GUI 550 may be a graphical user interface generated by a native software application executing on client device 150.

As illustrated, GUI 550 may include portion 554 corresponding to a search results view, when a user submits a search request via graphical element 514 of GUI 500. Graphical element 514 may include the search term or phrase entered by the user. For example, as illustrated, a user may have submitted a search request for "Basetball game." Based on the operations discussed above in conjunction with FIG. 3A, searching service 234 may have generated a set of corrected search suggestions to the user.

As illustrated, GUI 550 may further include graphical element 556 and graphical element 558. Graphical element 556 may be representative of a result count for the query. For example, graphical element 556 may recite "0 results" when searching service 234 returns a corrected search suggestion. Graphical element 458 may be representative of a results area. In those embodiments in which a corrected search suggestion is generated, searching service 234 may present the user with corrected search suggestions via graphical element 558. In some embodiments, the corrected search suggestions may be listed by their ranking. In some embodiments, each corrected search suggestion may be presented as an actionable element.

As illustrated, the corrected search suggestions in graphical element 558 are listed in a different order from graphical element 458. This may be attributed to the search request occurring within the Folder 1 page compared to the user's homepage. Continuing with the above example, searching service 234 may have determined that "basketball game" is recited 40 times in personalized vocabulary 242 and "baseball game" is recited 20 times in personalized vocabulary 242. Because the search request illustrated in FIG. 5B may be constrained to Folder 1, searching service 234 may have determined, for example, that "baseball game" is recited 20 times in Folder 1 and "basketball game" is recited 5 times in Folder 1. Accordingly, the relevancy of "baseball game" is higher in Folder 1 than generally across content items associated with the user's namespace. Therefore, the corrected search suggestions provided to the user via GUI 550 may be different from the corrected search suggestions provided to the user via GUI 450.

Figure 6:
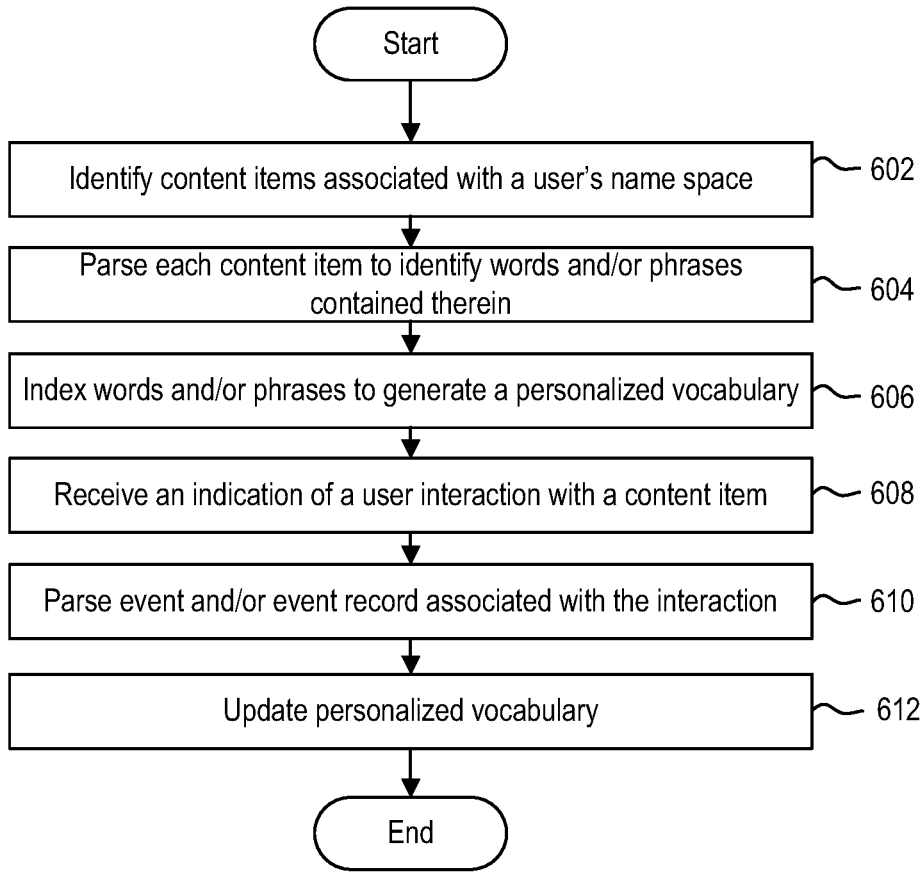
FIG. 6 is a flow diagram illustrating a method of maintaining a personalized vocabulary, according to example embodiments.

FIG. 6 is a flow diagram illustrating a method 600 of generating and maintaining personalized vocabulary 242, according to example embodiments. Method 600 may begin as step 602.

At step 602, content item processor 236 may identify content items associated with a user's namespace. In some embodiments, identifying content items associated with a user's namespace may include identifying whether the user has other namespaces linked to their account. If the user has another namespace linked to their account, content item processor 236 may also identify content item's associated with the linked namespace.

At step 604, content item processor 236 may parse some, all, or substantially all content items associated with a user's namespace. In some embodiments, parsing some, all, or substantially all content items associated with the user's namespace may include content item processor 236 parsing all content items within or associated with the user's namespace.

At step 606, content item processor 236 may index some, all or substantially all words and/or phrases identified in the parsed user's content items based on a frequency of occurrence. In some embodiments, indexing some, all or substantially all word and/or phrase identified in the parsed user's content items may include storing information associated with some, all or substantially all words and/or phrases. For example, in some embodiments, parsing some, all, or substantially all content items associated with the user's namespace may include maintaining a location of some, all or substantially all terms and/or phrases identified in the content item within the namespace. In some embodiments, content item processor 236 may maintain a path location of some, all or substantially all words and/or phrases associated with the user's namespace. In another example, in some embodiments, parsing some, all or substantially all content items associated with the user's namespace may include determining a date associated with some, all or substantially all words and/or phrases identified in respective content items. In some embodiments, parsing some, all or substantially all content items associated with the user's namespace may include parsing some, all or substantially all content items in namespaces linked to the user's namespace. In some embodiments, parsing some, all or substantially all content items associated with the user's namespace may include determining a device from which the user uploaded and/or modified a respective content item.

At step 608, content item processor 236 may receive an indication of a user interaction with a content item. In some embodiments, content item processor 236 may receive an indication by monitoring storage location 240 for new event or event records created by CMS service 232. In some embodiments, content item processor 236 may receive an indication responsive to CMS service 232 activating content item processor 236 upon creating an event or event record. In some embodiments, content item processor 236 may be configured to parse storage location 240 periodically, to identify new event or event records created by CMS service 232.

At step 610, content item processor 236 may parse event and/or event record associated with the interaction. In some embodiments, upon determining that a new event or event record exists (i.e., an interaction with a content item), content item processor 236 may analyze the interaction that triggered creation of an event or event record. For example, if the interaction that triggered the event or event record is client device 202 uploading content item 302 to content management system 230, content item processor 236 may parse content item 302 to index some, all or substantially all terms and/or phrases contained therein. In another example, if the interaction that triggered the event or event record is client device 202 modifying content item 302 in content management system 230, content item processor 236 may parse event and/or event record to identify any changes in content item 302.

At step 612, content item processor 236 may update personalized vocabulary 242 associated accordingly. In some embodiments, upon determining that words and/or terms were added to a content item, content item processor 236 may index those words and/or terms in personalized vocabulary 242. In some embodiments, upon determining that words and/or terms were removed from a content item, content item processor 236 may re-index personalized vocabulary 242. For example, upon determining that there are now fewer recitations of a term recited in user's content items, content item processor 236 may update the frequency count for that term. In some embodiments, content item processor 236 may not re-index personalized vocabulary based on removed terms and/or phrases.

Figure 7:
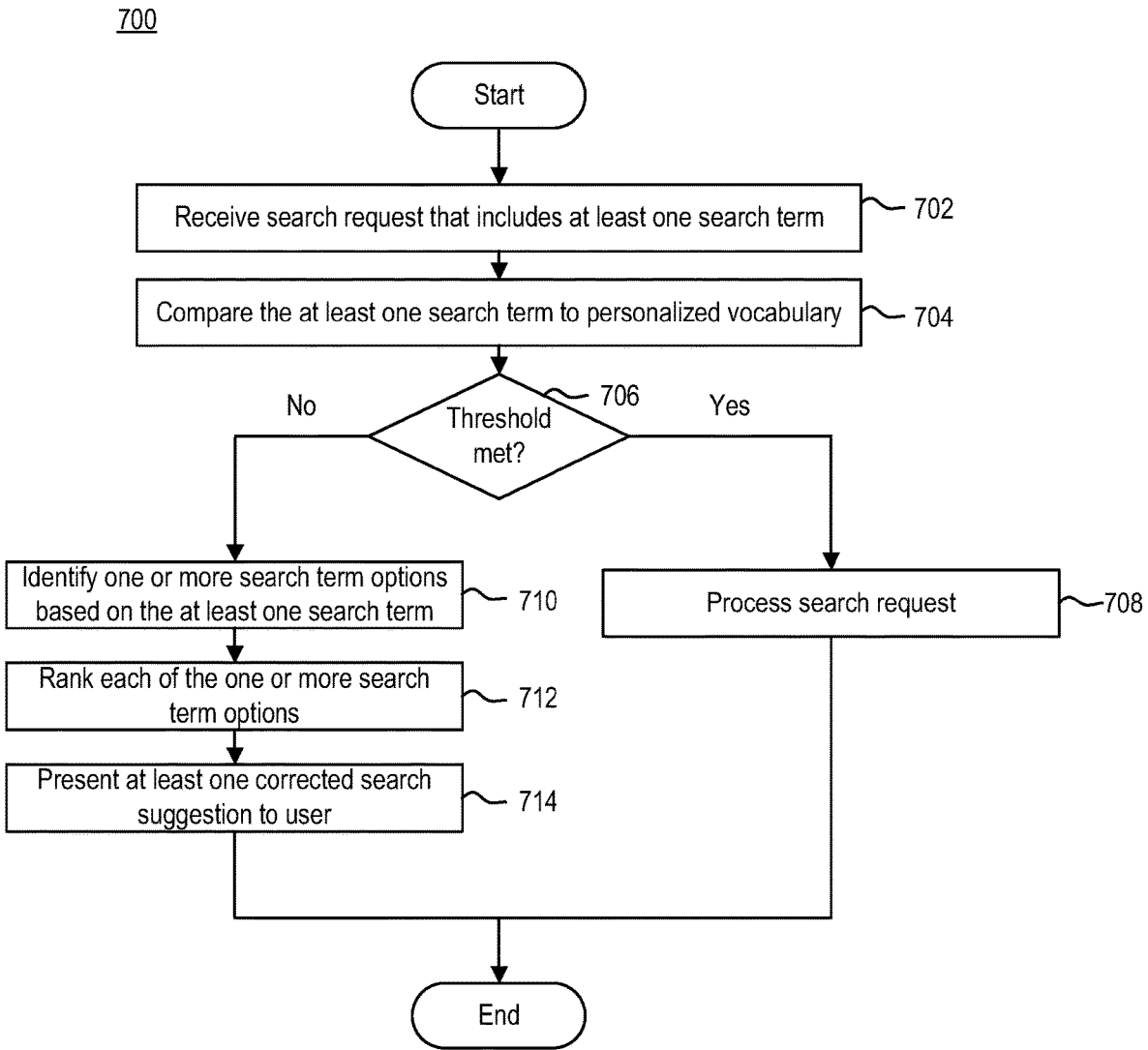
FIG. 7 is a flow diagram illustrating a method of generating a corrected search suggestion, according to example embodiments.

FIG. 7 is a flow diagram illustrating a method 700 of generating a corrected search suggestion, according to example embodiments. Method 700 may begin at step 702.

At step 702, content management system 110 may receive a search request from client device 150. In some embodiments, content management system 110 may receive the search request from client device 150 via a search bar on a GUI presented to the user on client device 150. In some embodiments, search request may include at least one term.

At step 704, content management system 110 may compare the at least one search term to personalized vocabulary 242. For example, to process search request 304, processor 306 may query storage location 240 to determine if the term in search request 304 occurs at least a threshold number of times in personalized vocabulary 242. Determining whether the term in search request 304 occurs at least the threshold number of times provides a sense of confidence that the term is not a typo or misspelling.

At step 706, content management system 110 may determine whether the at least one term occurs at least a threshold number of times. If at step 706, content management system 110 determines that the at least one term occurs at least the threshold number of times in personalized vocabulary 242, then method 700 may proceed to step 708. At step 708, content management system 110 may process the search request. For example, searching service 234 may query storage location 240 using the search term.

If, however, at step 706, content management system 110 determines that the at least one term does not occur at least the threshold number of times, content management system 110 may generate a corrected search suggestion for the user. To generate the corrected search suggestion, content management system 110 may generate a plurality of search term options for what the user may have meant to use, based on personalized vocabulary 242, and present those search term options to the user.

At step 710, content management system 110 may identify one or more search term options based on the at least one term. In some embodiments, content management system 110 may identify one or more search term options by identifying a prefix of the at least one term. Using a specific example, assume the search term submitted by client device 202 was "baseball." In some embodiments, searching service 234 may determine that the prefix of the search team is "b." Based on the prefix, content management system 110 may identify a plurality terms in personalized vocabulary 242 that include the same prefix. In other words, continuing with the above example, searching service 234 may identify a plurality of terms in personalized vocabulary 242 that begin with the letter "b." In some embodiments, searching service 234 may generate a data set corresponding to the plurality of search term options. For example, an exemplary data set may include [basketball, basketballs, baseball, baseballs, basket, base, . . . , etc.]. The data set may include a plurality of terms in personalized vocabulary 242 that have the same prefix.

At step 712, content management system 110 may rank each of the one or more search term options. After the data set is generated, searching service 234 may utilize ranking model 308 to determine at least one corrected search suggestion to provide to the user. Ranking model 308 may be representative of a model that ranks each of the search term options based on a variety of variables. In some embodiments, ranking model 308 may rank each of the search term options based on their frequency of occurrence in personalized vocabulary 242. In some embodiments, ranking model 308 may rank each of the search term options based on their edit distances from the search term. In some embodiments, ranking model 308 may rank each of the search term options based on a data associated with their generation. In some embodiments, ranking model 308 may rank each of the search term options based on their location within the user's namespace.

At step 714, content management system 110 may present at least one corrected search suggestions to the user based on the ranking. Based on the ranking, searching service 234 may present a corrected search suggestion to the user. In some embodiments, searching service 234 may present a single corrected search suggestion. In some embodiments, searching service 234 may present at least two corrected search suggestions. In some embodiments, searching service 234 may generate an actionable link for each corrected search suggestion. For example, a user may click on the corrected search suggestion, which would trigger a search request of that corrected search suggestion from client device 202 to searching service 234.

Figure 8:
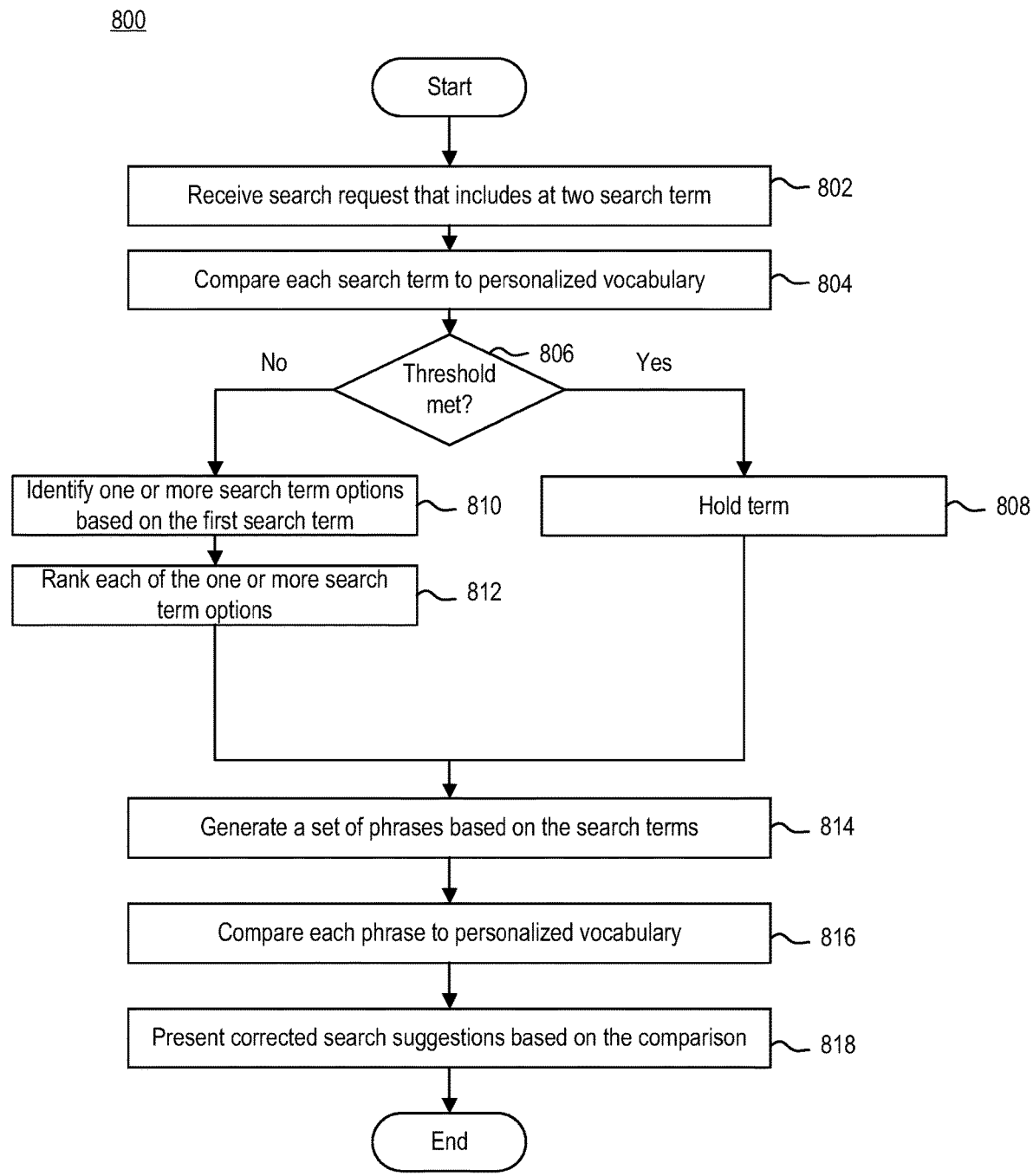
FIG. 8 is a flow diagram illustrating a method of generating a corrected search suggestion, according to example embodiments.

FIG. 8 is a flow diagram illustrating a method 800 of generating a corrected search suggestion, according to example embodiments. Method 800 may begin at step 802.

At step 802, content management system 110 may receive a search request from client device 150. In some embodiments, content management system 110 may receive the search request from client device 150 via a search bar on a GUI presented to the user on client device 150. In some embodiments, search request may include at least two terms: a first term and a second term.

At step 804, content management system 110 may compare each search term of the at least two search terms to personalized vocabulary 242. For example, to process search request 304, processor 306 may query storage location 240 to determine if each term in search request 304 occurs at least a threshold number of times in personalized vocabulary 242. Determining whether each term in search request 304 occurs at least the threshold number of times provides a sense of confidence that each term is not a typo or misspelling.

At step 806, content management system 110 may determine whether each term occurs at least a threshold number of times. If at step 806, content management system 110 determines that the second term occurs at least the threshold number of times in personalized vocabulary 242, then method 800 may proceed to step 808. At step 808, content management system 110 may hold the second term for further processing in steps 816-820.

If, however, at step 806, content management system 110 determines that a term in the at least two search terms does not occur at least the threshold number of times, content management system 110 may generate a corrected search suggestion for the user. To generate the corrected search suggestion, processor content management system 110 may generate a plurality of search term options for what the user may have meant to use, based on personalized vocabulary 242, and present those search term options to the user.

At step 810, content management system 110 may identify one or more search term options based on the first term. In some embodiments, content management system 110 may identify a prefix of the first term. Using a specific example, assume the search term submitted by client device 202 was "basetball game." As those skilled in the art recognize, "game" is spelled correctly. For purposes of the example, assume that "game" occurs at least the threshold number of times. Accordingly, content management system 110 may determine that the prefix of the first team "basetball" is "b." Content management system 110 does not need to perform similar operations on "game" because "game" is assumed to have occurred at least the threshold number of times.

Using the prefix, content management system 110 may identify a plurality of terms in personalized vocabulary 242 that include the same prefix as the first term. In other words, continuing with the above example, content management system 110 may identify a plurality of terms in personalized vocabulary 242 that begin with the letter "b." In some embodiments, content management system 110 may generate a data set corresponding to the plurality of search term options. For example, an exemplary data set may include [basketball, basketballs, baseball, baseballs, basket, base, . . . , etc.]. The data set may include a plurality of terms in personalized vocabulary 242 that has the same prefix.

At step 812, content management system 110 may rank each of the one or more search term options. After the data set is generated, content management system 110 may utilize ranking model 308 to determine at least one corrected search suggestion for the first term. Ranking model 308 may be representative of a model that ranks each of the search term options based on a variety of variables. In some embodiments, ranking model 308 may rank each of the search term options based on their frequency of occurrence in personalized vocabulary 242. In some embodiments, ranking model 308 may rank each of the search term options based on their edit distances from the search term. In some embodiments, ranking model 308 may rank each of the search term options based on a data associated with their generation. In some embodiments, ranking model 308 may rank each of the search term options based on their location within the user's namespace.

At step 814, content management system 110 may generate a set of phrases based on the one or more search term options and the second term. For example, based on the ranking, content management system 110 may add the search terms together to generate a set of phrases. Continuing with the above example, content management system 110 may generate an exemplary data set that may include: [basketball game, basketballs game, baseball game, baseballs game, basket game, base game, game basketball, game basketballs, game baseball, game baseballs, game basketball, game, base, etc.].

At step 816, content management system 110 may compare each phrase to personalized vocabulary 242. For example, searching service 234 may compare each phrase in the exemplary data set to personalized vocabulary 242 to determine a number of occurrences of each phrase. Continuing with the above example, content management system 110 may determine that "basketball game" occurs 40 times in personalized vocabulary 242 and "baseball game" occurs 20 times in personalized vocabulary 242.

At step 818, content management system 110 may present at least one corrected search suggestions to the user based on the ranking. In some embodiments, searching service 234 may present a single corrected search suggestion. In some embodiments, searching service 234 may present at least two corrected search suggestions. In some embodiments, searching service 234 may generate an actionable link for each corrected search suggestion. For example, a user may click on the corrected search suggestion, which would trigger a search request of that corrected search suggestion from client device 202 to searching service 234.

FIG. 9A illustrates a system bus computing system architecture 900, according to example embodiments. One or more components of system 900 may be in electrical communication with each other using a bus 905. System 900 may include a processor (e.g., one or more CPUs, GPUs or other types of processors) 910 and a system bus 905 that couples various system components including the system memory 915, such as read only memory (ROM) 920 and random access memory (RAM) 925, to processor 910. System 900 can include a cache of high-speed memory connected directly with, in close proximity to, or integrated as part of processor 910. System 900 can copy data from memory 915 and/or storage device 930 to cache 912 for quick access by processor 910. In this way, cache 912 may provide a performance boost that avoids processor 910 delays while waiting for data. These and other modules can control or be configured to control processor 910 to perform various actions. Other system memory 915 may be available for use as well. Memory 915 may include multiple different types of memory with different performance characteristics. Processor 910 may be representative of a single processor or multiple processors. Processor 910 can include one or more of a general purpose processor or a hardware module or software module, such as service 1 932, service 2 934, and service 3 936 stored in storage device 930, configured to control processor 910, as well as a special-purpose processor where software instructions are incorporated into the actual processor design. Processor 910 may essentially be a completely self-contained computing system, containing multiple cores or processors, a bus, memory controller, cache, etc. A multi-core processor may be symmetric or asymmetric.

To enable user interaction with the computing device 900, an input device 945 can represent any number of input mechanisms, such as a microphone for speech, a touch-sensitive screen for gesture or graphical input, keyboard, mouse, motion input, speech and so forth. An output device 935 can also be one or more of a number of output mechanisms known to those of skill in the art. In some instances, multimodal systems can enable a user to provide multiple types of input to communicate with computing device 900. Communications interface 940 can generally govern and manage the user input and system output. There is no restriction on operating on any particular hardware arrangement and therefore the basic features here may easily be substituted for improved hardware or firmware arrangements as they are developed.

Storage device 930 may be a non-volatile memory and can be a hard disk or other types of computer readable media which can store data that are accessible by a computer, such as magnetic cassettes, flash memory cards, solid state memory devices, digital versatile disks, cartridges, random access memories (RAMs) 925, read only memory (ROM) 920, and hybrids thereof. Storage device 930 can include services 932, 934, and 936 for controlling the processor 910. Other hardware or software modules are contemplated. Storage device 930 can be connected to system bus 905. In one aspect, a hardware module that performs a particular function can include the software component stored in a computer-readable medium in connection with the necessary hardware components, such as processor 910, bus 905, display 935, and so forth, to carry out the function.

FIG. 9B illustrates a computer system 950 having a chipset architecture that can be used in executing the described method and generating and displaying a graphical user interface (GUI). Computer system 950 may be an example of computer hardware, software, and firmware that can be used to implement the disclosed technology. System 950 can include one or more processors 955, representative of any number of physically and/or logically distinct resources capable of executing software, firmware, and hardware configured to perform identified computations. One or more processors 955 can communicate with a chipset 960 that can control input to and output from one or more processors 955. In this example, chipset 960 outputs information to output 965, such as a display, and can read and write information to storage device 970, which can include magnetic media, and solid state media, for example. Chipset 960 can also read data from and write data to RAM 975. A bridge 980 for interfacing with a variety of user interface components 985 can be provided for interfacing with chipset 960. Such user interface components 985 can include a keyboard, a microphone, touch detection and processing circuitry, a pointing device, such as a mouse, and so on. In general, inputs to system 950 can come from any of a variety of sources, machine generated and/or human generated.

Chipset 960 can also interface with one or more communication interfaces 990 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by one or more processors 955 analyzing data stored in storage 970 or 975. Further, the machine can receive inputs from a user through user interface components 985 and execute appropriate functions, such as browsing functions by interpreting these inputs using one or more processors 955.

It can be appreciated that example systems 900 and 950 can have more than one processor 910 or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

The invention claimed is:

1. A method, comprising:
generating, by a content management system, a personalized vocabulary for a user account by analyzing content items associated with a file directory structure of the user account, wherein the personalized vocabulary comprises an indication of where each occurrence of each term is located within a hierarchy of the file directory structure;
receiving, by the content management system, a query comprising a first search term and a second search term;
determining, by the content management system, that the first search term does not occur at least a threshold number of times in the personalized vocabulary;
parsing, by the content management system, the personalized vocabulary based on each of the first search term and the second search term to identify first search term options and second search term options;
generating, by the content management system, a personalized ranking of the first search term options, wherein the personalized ranking is based on:
a location of each occurrence of each first search term option within the hierarchy of the file directory structure, and
one or more of: an edit distance between each first search term option and the first search term, and a frequency of occurrence of each first search term option in the personalized vocabulary; and
determining, by the content management system, that the second search term occurs at least the threshold number of times in the personalized vocabulary;
generating, by the content management system, a set of phrases by combining each second search term option with the second search term; and
comparing each phrase in the set of phrases to the personalized vocabulary; and
providing for display, by the content management system, at least one of the search term options based on the personalized ranking and at least one of the set of phrases.

2. The method of claim 1, further comprising:
determining that the query was received via a graphical user interface dedicated to a specific file location.

3. The method of claim 2, wherein the personalized ranking is weighted based on the location of each occurrence of each search term option in the personalized vocabulary.

4. The method of claim 1, further comprising:
receiving, by the content management system, a second query comprising the first search term from a second user;
determining, by the content management system, that the first search term does not occur at least the threshold number of times in a second personalized vocabulary associated with the second user;
parsing, by the content management system, the second personalized vocabulary based on the first search term to identify second search term options, the second search term options being different from the search term options;
generating, by the content management system, a second personalized ranking of the second search term options; and
providing for display, by the content management system, at least a second one of the second search term options.

5. The method of claim 4, wherein the at least second one of the second search term options is different from the search term options.

6. A non-transitory computer readable medium including one or more sequences of instructions that, when executed by one or more processors, cause a processor in communication with one or more input devices to perform operations comprising:
receiving, by a content management system, a query comprising a first search term and a second search term;
comparing, by the content management system, the first search term to a personalized vocabulary associated with a user account, the personalized vocabulary comprising an indexing of a plurality of terms contained in content items associated with the user account, wherein the index comprises an indication of where each occurrence of each term is located within a hierarchy of a file directory structure of an account of the user;
determining, by the content management system, that the first search term includes a first error;

parsing, by the content management system, the personalized vocabulary based on the first error in the first search term;

generating, by the content management system, first search term options by comparing the first search term to the personalized vocabulary and second search term options by comparing the second search term to the personalized vocabulary;

generating, by the content management system, a personalized ranking of the search term options, wherein the personalized ranking is based on:
 a location of each occurrence of each search term option within the hierarchy of the file directory structure of the account, and
 one or more of: an edit distance between each search term option and the first search term, and a frequency of each search term option's occurrence in the personalized vocabulary; and determining, by the content management system, that the second search term does not include a second error;

generating, by the content management system, a set of phrases by combining each second search term option with the second search term;

comparing each phrase in the set of phrases to the personalized vocabulary; and providing for display, by the content management system, at least one of the search term options based on the personalized ranking and at least one of the set of phrases.

7. The non-transitory computer readable medium of claim 6, further comprising:
 determining that the query was received via a graphical user interface dedicated to a specific file location.

8. The non-transitory computer readable medium of claim 6, wherein the personalized ranking is weighted based on a location of each occurrence of each search term option in the personalized vocabulary.

9. The non-transitory computer readable medium of claim 6, wherein the query comprises at least a second search term.

10. The non-transitory computer readable medium of claim 9, further comprising:
 determining, by the content management system, that at least the second search term does not include a typographical error.

11. The non-transitory computer readable medium of claim 10, further comprising:
 generating, by the content management system, a set of phrases by combining each search term option with at least the second search term.

12. The non-transitory computer readable medium of claim 11, further comprising:
 comparing each phrase in the set of phrases to the personalized vocabulary.

13. A system comprising:
one or more processors; and
a memory having programming instructions stored thereon, which, when executed by the one or more processors, cause the system to perform operations comprising:
 receiving, from a user, a query comprising at least a first search term and a second search term;
 comparing the first search term and the second search term to a personalized vocabulary associated with the user, the personalized vocabulary comprising an indexing of a plurality of terms contained in content items associated with the user, wherein the indexing comprises an indication of where each occurrence of each term is located within a hierarchy of a file directory structure associated with an account of the user;
 determining that the first search term includes a typographical error;
 determining that the second search term does not include a typographical error;
 parsing the personalized vocabulary based on the first search term;
 generating search term options by comparing the first search term to the personalized vocabulary;
 generating a set of phrases by combining each search term option with the second search term;
 comparing each phrase in the set of phrases to the personalized vocabulary;
 generating a personalized ranking of phrases, wherein the personalized ranking is based on:
  a location of each occurrence of each search term option within the hierarchy of the file directory structure of the account, and
  one or more of: an edit distance between each phrase and the first search term and the second search term, and a frequency of each phrase's occurrence in the personalized vocabulary; and
 providing for display at least one of the set of phrases based on the personalized ranking of phrases.

14. The system of claim 13, further comprising:
 determining that the user submitted the query via a graphical user interface dedicated to a specific file location.

15. The system of claim 14, wherein the personalized ranking is weighted based on a location of each occurrence of each phrase in the personalized vocabulary.

* * * * *

UNITED STATES PATENT AND TRADEMARK OFFICE
CERTIFICATE OF CORRECTION

Page 1 of 1

PATENT NO. : 12,210,518 B2
APPLICATION NO. : 16/871398
DATED : January 28, 2025
INVENTOR(S) : Matt Barta It is certified that error appears in the above-identified patent and that said Letters Patent is hereby corrected as shown below:

In the Claims

In Claim 13, Column 34, Line 22:
"graphical error;"
Should be corrected as follows:
"graphical error based on the first search term not occurring a threshold number of times in the personalized vocabulary;"

In Claim 13, Column 34, Line 24:
"include a typographical error;"
Should be corrected as follows:
"include a typographical error based on the second search term occurring the threshold number of times in the personalized vocabulary;"

Signed and Sealed this
Seventh Day of October, 2025

John A. Squires
*Director of the United States Patent and Trademark Office*